(12) United States Patent
Borders et al.

(10) Patent No.: US 8,170,915 B2
(45) Date of Patent: May 1, 2012

(54) ONLINE STORE PRODUCT AVAILABILITY

(75) Inventors: Louis H. Borders, Palo Alto, CA (US);
Arvind Peter Relan, Atherton, CA (US);
Margaret Sue Lloyd, Menlo Park, CA (US); Sunil Bhargava, Hillsborough, CA (US); Joyo Wijaya, Menlo Park, CA (US); Peter Ham, Hertfordshire (GB); Gray Andrew Clossman, Palo Alto, CA (US); Ajit Ramachandra Mayya, Saratoga, CA (US)

(73) Assignee: IpVenture, Inc., Los Altos, CA (US)

( * ) Notice: Subject to any disclaimer, the term of this patent is extended or adjusted under 35 U.S.C. 154(b) by 92 days.

(21) Appl. No.: 11/705,982

(22) Filed: Feb. 12, 2007

(65) Prior Publication Data

US 2007/0174144 A1 Jul. 26, 2007

Related U.S. Application Data

(63) Continuation of application No. 09/568,603, filed on May 10, 2000, now Pat. No. 7,177,825.

(60) Provisional application No. 60/133,646, filed on May 11, 1999.

(51) Int. Cl.
*G06Q 30/00* (2006.01)
(52) U.S. Cl. .............................. 705/26; 705/1
(58) Field of Classification Search ............ 705/26, 705/27
See application file for complete search history.

(56) References Cited

U.S. PATENT DOCUMENTS

| | | | |
|---|---|---|---|
| 2,781,643 A | 2/1957 | Fairweather | |
| 3,406,532 A | 10/1968 | Rownd et al. | |
| 3,670,867 A | 6/1972 | Traube | |
| 4,213,310 A | 7/1980 | Buss | |
| 4,455,453 A | 6/1984 | Parasekvakos et al. | |
| 4,530,067 A | 7/1985 | Dorr | |
| 4,656,591 A | 4/1987 | Goldberg | |
| 4,799,156 A | 1/1989 | Shavit et al. | |
| 4,803,348 A | 2/1989 | Lohrey et al. | |
| 4,823,984 A | 4/1989 | Ficken | |
| 4,887,208 A | 12/1989 | Schneider et al. | |
| 4,936,738 A | 6/1990 | Brennan | |
| 4,958,280 A | 9/1990 | Pauly et al. | |

(Continued)

FOREIGN PATENT DOCUMENTS

| | | |
|---|---|---|
| EP | 0 425 405 A2 | 5/1991 |
| FR | 2696722 | 4/1994 |
| GB | 2 265 032 A | 9/1993 |
| WO | WO99/07121 | 2/1999 |
| WO | WO 99/09508 | 2/1999 |

OTHER PUBLICATIONS eShopper: Resources for Web Buying. Savetz, Kevin; Gardiner, Peace, Computer Shopper , 19 , 5 , 280(1), May 1999.*

(Continued)

*Primary Examiner* — Matthew S. Gart
*Assistant Examiner* — R. Shay Glass

(57) ABSTRACT

A technique for effecting electronic commerce using a data network is described. The data network includes a plurality of subsystems which, together, form an integrated system for receiving customer orders for selected items via a data network, fulfilling the customer orders, and delivering the ordered products to the customers. Moreover, according to a specific embodiment, the integrated nature of the system architecture of the present invention allows the on-line merchant to provide a guarantee to the customer that the ordered items will be available to be delivered to the customer at the specified delivery date, time, and location.

24 Claims, 17 Drawing Sheets

U.S. PATENT DOCUMENTS

| | | | |
|---|---|---|---|
| 5,038,283 A | 8/1991 | Caveney | |
| 5,093,794 A | 3/1992 | Howie et al. | |
| 5,101,352 A | 3/1992 | Rembert | |
| 5,105,627 A | 4/1992 | Kurita | |
| 5,113,349 A | 5/1992 | Nakamura et al. | |
| 5,122,959 A | 6/1992 | Nathanson et al. | |
| 5,235,819 A | 8/1993 | Bruce | |
| 5,237,158 A | 8/1993 | Kern et al. | |
| 5,246,332 A | 9/1993 | Bernard | |
| 5,265,006 A | 11/1993 | Asthana | |
| 5,272,638 A | 12/1993 | Martin et al. | |
| 5,273,392 A | 12/1993 | Bernard | |
| 5,322,406 A | 6/1994 | Pippin et al. | |
| 5,334,824 A | 8/1994 | Martinez | |
| 5,362,948 A | 11/1994 | Morimoto | |
| 5,363,310 A | 11/1994 | Haj-Ali Ahmadi et al. | |
| 5,395,206 A | 3/1995 | Cerny, Jr. | |
| 5,402,336 A | 3/1995 | Spiegelhoff et al. | |
| 5,428,546 A | 6/1995 | Shah et al. | |
| 5,434,394 A | 7/1995 | Roach et al. | |
| 5,444,844 A | 8/1995 | Inoue et al. | |
| 5,450,317 A | 9/1995 | Lu et al. | |
| 5,479,530 A | 12/1995 | Nair et al. | |
| 5,533,361 A | 7/1996 | Halpern | |
| 5,535,407 A | 7/1996 | Yanagawa et al. | |
| 5,548,518 A | 8/1996 | Dietrich et al. | |
| 5,553,312 A | 9/1996 | Gattey et al. | |
| 5,568,393 A | 10/1996 | Ando et al. | |
| 5,592,378 A | 1/1997 | Cameron et al. | |
| 5,593,269 A | 1/1997 | Bernard | |
| 5,598,487 A | 1/1997 | Hacker et al. | |
| 5,615,121 A | 3/1997 | Babayev et al. | |
| 5,640,002 A | 6/1997 | Ruppert et al. | |
| 5,664,110 A | 9/1997 | Green et al. | |
| 5,666,493 A | 9/1997 | Wojcik et al. | |
| 5,687,322 A | 11/1997 | Deaton et al. | |
| 5,694,551 A | 12/1997 | Doyle et al. | |
| 5,710,887 A | 1/1998 | Chelliah et al. | |
| 5,712,989 A | 1/1998 | Johnson et al. | |
| 5,758,313 A | 5/1998 | Shah et al. | |
| 5,758,328 A | 5/1998 | Giovannoli | |
| 5,758,329 A | 5/1998 | Wojcik et al. | |
| 5,761,673 A | 6/1998 | Bookman et al. | |
| 5,768,139 A | 6/1998 | Pippin et al. | |
| H1743 H | 8/1998 | Graves et al. | |
| 5,809,479 A | 9/1998 | Martin et al. | |
| 5,816,725 A | 10/1998 | Sherman et al. | |
| 5,826,242 A | 10/1998 | Montulli | |
| 5,826,825 A | 10/1998 | Gabriet | |
| 5,831,860 A | 11/1998 | Foladare et al. | |
| 5,832,457 A | 11/1998 | Cherney et al. | |
| 5,834,753 A | 11/1998 | Danielson et al. | |
| 5,835,914 A | 11/1998 | Brim | |
| 5,839,117 A | 11/1998 | Cameron et al. | |
| 5,848,395 A | 12/1998 | Edgar et al. | |
| 5,878,401 A | 3/1999 | Joseph | |
| 5,880,443 A | 3/1999 | McDonald et al. | |
| 5,884,216 A | 3/1999 | Shah et al. | |
| 5,893,076 A | 4/1999 | Hafner et al. | |
| 5,894,554 A | 4/1999 | Lowery et al. | |
| 5,895,454 A | 4/1999 | Harrington | |
| 5,897,622 A | 4/1999 | Blinn et al. | |
| 5,897,629 A | 4/1999 | Shinagawa et al. | |
| 5,899,088 A | 5/1999 | Purdum | |
| 5,910,896 A | 6/1999 | Hahn-Carlson | |
| 5,918,213 A | 6/1999 | Bernard et al. | |
| 5,922,040 A | 7/1999 | Prabhakaran | |
| 5,943,652 A | 8/1999 | Sisley et al. | |
| 5,943,841 A | 8/1999 | Wunscher | |
| 5,949,776 A | 9/1999 | Mahany et al. | |
| 5,956,709 A | 9/1999 | Xue | |
| 5,960,411 A | 9/1999 | Hartman et al. | |
| 5,961,601 A | 10/1999 | Iyengar | |
| 5,963,919 A | 10/1999 | Brinkley et al. | |
| 5,974,401 A | 10/1999 | Enomoto et al. | |
| 5,979,757 A | 11/1999 | Tracy et al. | |
| 5,983,200 A | 11/1999 | Slotznick | |
| 5,987,377 A | 11/1999 | Westerlage et al. | |
| 5,991,739 A * | 11/1999 | Cupps et al. | 705/26 |
| 5,999,914 A | 12/1999 | Blinn et al. | |
| 6,003,015 A | 12/1999 | Kang et al. | |
| 6,006,100 A | 12/1999 | Koenck et al. | |
| 6,016,504 A | 1/2000 | Arnold et al. | |
| 6,023,683 A | 2/2000 | Johnson et al. | |
| 6,026,378 A | 2/2000 | Onozaki | |
| 6,058,417 A | 5/2000 | Hess et al. | |
| 6,061,607 A | 5/2000 | Bradley et al. | |
| 6,070,147 A | 5/2000 | Harms et al. | |
| 6,073,108 A | 6/2000 | Peterson | |
| 6,081,789 A | 6/2000 | Purcell | |
| 6,083,279 A | 7/2000 | Cuomo et al. | |
| 6,084,528 A | 7/2000 | Beach et al. | |
| 6,085,170 A | 7/2000 | Tsukuda | |
| 6,087,952 A | 7/2000 | Prabhakaran | |
| 6,088,648 A | 7/2000 | Shah et al. | |
| 6,094,642 A | 7/2000 | Stephenson et al. | |
| 6,101,481 A | 8/2000 | Miller | |
| 6,101,486 A | 8/2000 | Roberts et al. | |
| 6,115,690 A * | 9/2000 | Wong | 705/7 |
| 6,123,259 A | 9/2000 | Ogasawara | |
| 6,140,922 A | 10/2000 | Kakou | |
| 6,144,848 A | 11/2000 | Walsh et al. | |
| 6,157,945 A | 12/2000 | Balma et al. | |
| 6,167,380 A | 12/2000 | Kennedy et al. | |
| 6,167,382 A | 12/2000 | Sparks et al. | |
| 6,178,510 B1 | 1/2001 | O'Connor et al. | |
| 6,182,053 B1 | 1/2001 | Rauber et al. | |
| 6,185,625 B1 | 2/2001 | Tso et al. | |
| 6,215,952 B1 | 4/2001 | Yoshio et al. | |
| 6,233,543 B1 | 5/2001 | Butts et al. | |
| 6,236,974 B1 | 5/2001 | Kolawa et al. | |
| 6,249,773 B1 * | 6/2001 | Allard et al. | 705/26 |
| 6,249,801 B1 | 6/2001 | Zisapel et al. | |
| 6,260,024 B1 | 7/2001 | Shkedy | |
| 6,275,812 B1 | 8/2001 | Haq et al. | |
| 6,289,260 B1 | 9/2001 | Bradley et al. | |
| 6,289,370 B1 | 9/2001 | Panarello et al. | |
| 6,292,784 B1 | 9/2001 | Martin et al. | |
| 6,324,520 B1 | 11/2001 | Walker et al. | |
| 6,332,334 B1 | 12/2001 | Faryabi | |
| 6,341,269 B1 | 1/2002 | Dulaney et al. | |
| 6,343,275 B1 * | 1/2002 | Wong | 705/26 |
| 6,397,246 B1 | 5/2002 | Wolfe | |
| 6,405,173 B1 | 6/2002 | Honarvar et al. | |
| 6,424,947 B1 | 7/2002 | Tsuria et al. | |
| 6,438,652 B1 | 8/2002 | Jordan et al. | |
| 6,445,976 B1 | 9/2002 | Ostro | |
| 6,453,306 B1 | 9/2002 | Quelene | |
| 6,463,345 B1 | 10/2002 | Peachey-Kountz et al. | |
| 6,463,420 B1 | 10/2002 | Guidice et al. | |
| 6,484,150 B1 | 11/2002 | Blinn et al. | |
| 6,490,567 B1 | 12/2002 | Gregory | |
| 6,496,205 B1 | 12/2002 | White et al. | |
| 6,505,093 B1 | 1/2003 | Thatcher et al. | |
| 6,505,171 B1 | 1/2003 | Cohen et al. | |
| 6,526,392 B1 | 2/2003 | Dietrich et al. | |
| 6,530,518 B1 | 3/2003 | Krichilsky et al. | |
| 6,549,891 B1 | 4/2003 | Rauber et al. | |
| 6,567,786 B1 | 5/2003 | Bibelnieks et al. | |
| 6,571,213 B1 | 5/2003 | Altendahl et al. | |
| 6,578,005 B1 | 6/2003 | Lesaint et al. | |
| 6,587,827 B1 | 7/2003 | Henning et al. | |
| 6,594,641 B1 | 7/2003 | Southam | |
| 6,594,692 B1 * | 7/2003 | Reisman | 705/26 |
| 6,595,342 B1 | 7/2003 | Maritzen et al. | |
| 6,598,024 B1 | 7/2003 | Walker et al. | |
| 6,598,027 B1 | 7/2003 | Breen, Jr. | |
| 6,622,127 B1 | 9/2003 | Klots et al. | |
| 6,654,726 B1 | 11/2003 | Hanzek | |
| 6,697,964 B1 | 2/2004 | Dodrill et al. | |
| 6,741,995 B1 | 5/2004 | Chen et al. | |
| 6,748,318 B1 | 6/2004 | Jones | |
| 6,748,418 B1 | 6/2004 | Yoshida et al. | |
| 6,763,496 B1 | 7/2004 | Hennings et al. | |
| 6,792,459 B2 | 9/2004 | Elnozahy et al. | |
| 6,862,572 B1 | 3/2005 | de Sylva | |
| 6,873,970 B2 | 3/2005 | Showghi et al. | |

| | | | |
|---|---|---|---|
| 6,879,965 B2 | 4/2005 | Fung et al. | |
| 6,904,455 B1 | 6/2005 | Yen | |
| 6,970,837 B1 | 11/2005 | Walker et al. | |
| 6,975,937 B1 | 12/2005 | Kantarjiev et al. | |
| 6,980,962 B1* | 12/2005 | Arganbright et al. | 705/26 |
| 6,990,460 B2 | 1/2006 | Parkinson | |
| 7,010,501 B1 | 3/2006 | Roslak et al. | |
| 7,028,187 B1 | 4/2006 | Rosen | |
| 7,035,914 B1 | 4/2006 | Payne et al. | |
| 7,040,541 B2* | 5/2006 | Swartz et al. | 235/472.02 |
| 7,085,729 B1 | 8/2006 | Kennedy et al. | |
| 7,139,637 B1 | 11/2006 | Waddington et al. | |
| 7,139,721 B2 | 11/2006 | Borders et al. | |
| 7,177,825 B1 | 2/2007 | Borders et al. | |
| 7,197,547 B1 | 3/2007 | Miller et al. | |
| 7,222,161 B2 | 5/2007 | Yen et al. | |
| 7,233,914 B1 | 6/2007 | Wijaya et al. | |
| 7,240,283 B1 | 7/2007 | Paila et al. | |
| 7,251,612 B1 | 7/2007 | Parker et al. | |
| 7,308,423 B1 | 12/2007 | Woodward et al. | |
| 7,346,564 B1 | 3/2008 | Kirklin et al. | |
| 7,383,233 B1 | 6/2008 | Singh et al. | |
| 7,792,713 B1 | 9/2010 | Kinney, Jr. et al. | |
| 2001/0013007 A1* | 8/2001 | Tsukuda | 705/8 |
| 2001/0016828 A1 | 8/2001 | Philippe et al. | |
| 2001/0037229 A1 | 11/2001 | Jacobs et al. | |
| 2001/0042021 A1 | 11/2001 | Matsuo et al. | |
| 2001/0042050 A1 | 11/2001 | Fletcher et al. | |
| 2001/0047285 A1 | 11/2001 | Borders et al. | |
| 2001/0047310 A1 | 11/2001 | Russell | |
| 2001/0049619 A1 | 12/2001 | Powell et al. | |
| 2001/0049672 A1 | 12/2001 | Moore | |
| 2002/0002513 A1 | 1/2002 | Chiasson | |
| 2002/0004766 A1 | 1/2002 | White | |
| 2002/0007299 A1 | 1/2002 | Florence | |
| 2002/0010633 A1* | 1/2002 | Brotherston | 705/26 |
| 2002/0013950 A1 | 1/2002 | Tomsen | |
| 2002/0038224 A1 | 3/2002 | Bhadra | |
| 2002/0038261 A1 | 3/2002 | Kargman et al. | |
| 2002/0049853 A1 | 4/2002 | Chu et al. | |
| 2002/0050526 A1* | 5/2002 | Swartz et al. | 235/472.02 |
| 2002/0065700 A1 | 5/2002 | Powell et al. | |
| 2002/0072994 A1 | 6/2002 | Mori et al. | |
| 2002/0103724 A1 | 8/2002 | Huxter | |
| 2002/0116279 A1 | 8/2002 | Nobillo | |
| 2002/0188530 A1 | 12/2002 | Wojcik et al. | |
| 2002/0194084 A1 | 12/2002 | Surles | |
| 2002/0194087 A1 | 12/2002 | Spiegel et al. | |
| 2003/0045340 A1 | 3/2003 | Roberts | |
| 2003/0065565 A1 | 4/2003 | Wagner et al. | |
| 2003/0079227 A1 | 4/2003 | Knowles et al. | |
| 2003/0119485 A1* | 6/2003 | Ogasawara | 455/411 |
| 2003/0233190 A1 | 12/2003 | Jones | |
| 2004/0107125 A1 | 6/2004 | Guheen et al. | |
| 2004/0236635 A1 | 11/2004 | Publicover | |
| 2005/0027580 A1 | 2/2005 | Crici et al. | |
| 2005/0144641 A1 | 6/2005 | Lewis | |
| 2005/0261985 A1 | 11/2005 | Miller et al. | |
| 2006/0085250 A1 | 4/2006 | Kantarjiev et al. | |
| 2006/0142895 A1 | 6/2006 | Waddington et al. | |
| 2007/0016463 A1 | 1/2007 | Borders et al. | |
| 2007/0055580 A1 | 3/2007 | Woodward et al. | |
| 2007/0112647 A1 | 5/2007 | Borders et al. | |
| 2007/0136149 A1 | 6/2007 | Woodward et al. | |
| 2007/0162353 A1 | 7/2007 | Borders et al. | |
| 2007/0250572 A1 | 10/2007 | Paila et al. | |
| 2008/0015959 A1 | 1/2008 | Kruglikov et al. | |
| 2009/0063439 A1 | 3/2009 | Rauser et al. | |
| 2009/0150534 A1 | 6/2009 | Miller et al. | |

OTHER PUBLICATIONS

"Peapod Interactive Grocery Shopping and Delivery Service Now Delivers Via the Internet", Press Release, peapod.com, Apr. 22, 1996, pp. 1-2.

Anupindi et al., "Estimation of Consumer Demand with Stock-Out Based Substitution: An Application to Vending Machine Product", Marketing Science, vol. 17, No. 4, 1998, pp. 406-423.

Automatic ID News, "20/20 Results Achieved with Technology Trio", Sep. 1995, p. 19.

Fynes, Brian, et al., The Impact of Electronic Data Interchange on Competitiveness in Retail Supply Chain, IBAR vol. 14, No. 2, pp. 16-28, 1993.

Hiroo Kawata, "Information Technology of Commercial Vehicles in the Japanese Parcel Service Business," Abstract No. XP-000560489, 1992, pp. 371-382.

Hyten, Todd, "Stop & Shop mulls online grocery store", Boston Business Journal (Boston, MA, US), Mar. 22, 1996, vol. 16, No. 6, p. 1.

Koster, Rene de, "Routing Orderpickers in a Warehouse: A Comparison Between Optimal and Heuristic Solutions," IIE Transactions, May 1998, vol. 30, No. 5, p. 469.

Maloney, David, "The New Corner Drugstore", Modern Materials Handling, May 1, 2000, vol. 55, No. 5, p. 58.

Norton, Tim R., "End-To-End Response-Time: Where to Measure?", Computer Measurement Group Conference Proceedings, CMG99 Session 423, Dec. 1999, pp. 1-9.

PC Foods, "Customer Service Agreement," printed from website: http://www.pcfoods.com, Abstract No. XP-002245026, 1999, pp. 1-2.

Pearce, Michael R. "From carts to clicks", Ivey Business Quarterly, Autumn 1998, vol. 63, No. 1, p. 69-71.

Sekita, Takashi, "The Physical Distribution Information Network in the Home-Delivery Business," Japan Computer Quarterly, Abstract No. XP-00.431194, 1990, pp. 23-32.

Smith et al., "Management of Multi-Item Retail Inventory Systems with Demand Substitution", Operations Research, vol. 48, No. 1, Jan.-Feb. 2000, pp. 50-64.

Towie, Henry, "On the Fast Track with Totaltracks: UPS Deploys Mobile Date Service," Abstract No. XP-000560076, Document Delivery World, vol. 9, No. 3, 1993, pp. 30-31.

Van Den Berg, Jeroen P., "A Literature Survey on Planning and Control of Warehousing Systems", IIE Transactions, Aug. 1999, vol. 31, No. 3, p. 751.

Vass et al., "The World Wide Web—Everything you (n)ever wanted to know about its server", IEEE, Oct./Nov. 1998, pp. 33-37.

Wilson, Joe, "Selecting Warehouse Management Software (WMS) for Food Distribution Operations", Frozen Food Digest, Oct. 1998, vol. 14, No. 1, p. 18.

Worth Wren Jr., Fort Worth Star-Telegram Texas, "Albertson's Expects Online Grocery Shopping to Boom", KRTBN Knight-Ridder Tribune Business News (Fort Worth Star-Telegram, Texas), Nov. 9, 1998.

Wunnava et al., "Interactive Mulitmedia on the World Wide Web", IEEE, Aug. 1999, pp. 110-115.

www.peapod.com, including Introduction to Peapod; How Peapod Works; Peapod: Choosing a Delivery Time; Peapod: Sending Your Order; Retrieved from Internet Archive (web.archive.org) on Jul. 23, 2006, alleged date Nov. 13, 1996, pp. 1-9.

U.S. Appl. No. 09/568,570, filed May 10, 2000.
U.S. Appl. No. 09/568,571, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
U.S. Appl. No. 09/620,199, filed Jul. 20, 2000.
U.S. Appl. No. 09/750,385, filed Dec. 27, 2000.
U.S. Appl. No. 09/792,400, filed Feb. 22, 2001.
U.S. Appl. No. 09/813,235, filed Mar. 19, 2001.
U.S. Appl. No. 11/594,669, filed Nov. 8, 2006.

Jaffe, Charles A. "Gas supplier takes timing seriously if deliveries are late, the product is free," The Morning Call, Allentown, PA, Feb. 5, 1989, pp. 1-4.

Parker, Rachel, "UPS Pioneers a cellular data network", InfoWorld, ABI/INFORM Global, Jun. 8, 1992, p. S59-S60.

U.S. Appl. No. 11/818,010, filed Jun. 13, 2007.
U.S. Appl. No. 12/074,283, filed Mar. 3, 2008.

Numetrix Unveils xtr@; an Internet-Designed Solution for Real-Time Supply Chain Collaboration, Business/Technology Editors, Business Wire, New York: Dec. 18, 1998, http://proquest.uml.com/pqdweb?index=11&did=37215461&SrchMode=2&sid=1&Fmt=3...Jan. 16, 2010, pp. 1-4.

Hoffman, Thomas, "New UPS CIO eyes cyberdelivery," Computerworld, Nov. 11, 1996, 30, 46; ABI/INFORM Global, p. 4.

Booker, et al. "Up in the air", Computerworld, Oct. 11, 1993; 27, 41; ABI/INFORM Global, p. 54.

"Imposing an Objective Viewpoint," Modern Purchasing, vol. 36, Iss. 3, Mar. 1994, pp. 1-4.

"New Medium, new message," The Economist, vol. 329, Iss. 7834, Oct. 23, 1993, p. S 16, pp. 1-5.

Office Action for U.S. Appl. No. 09/588,803 dated Apr. 30, 2003.
Office Action for U.S. Appl. No. 09/588,603 dated Jul. 3, 2003.
Office Action for U.S. Appl. No. 09/568,603 dated Feb. 8, 2004.
Advisory Action for U.S. Appl. No. 09/568,603 dated Mar. 4, 2004.
Restriction Requirement for U.S. Appl. No. 09/558,603 dated Dec. 20, 2004.
Office Action for U.S. Appl. No. 09/568,603 dated Apr. 27, 2005.
Office Action for U.S. Appl. No. 09/568,603 dated Oct. 7, 2005.
Advisory Action for U.S. Appl. No. 09/568,603 dated Dec. 6, 2005.
Office Action for U.S. Appl. No. 09/568,603 dated Mar. 30, 2006.
Office Action for U.S. Appl. No. 09/568,603 dated Jul. 17, 2008.
Notice of Allowance for U.S. Appl. No. 09/568,603 dated Oct. 25, 2006.
Office Action for U.S. Appl. No. 11/642,328 dated Apr. 21, 2008.
Office Action for U.S. Appl. No. 11/642,328 dated Oct. 24, 2008.
Office Action for U.S. Appl. No. 11/642,328 dated May 13, 2009.
Office Action for U.S. Appl. No. 11/642,328 dated Nov. 17, 2009.
Office Action for U.S. Appl. No. 11/642,328 dated Feb. 18, 2010.
Office Action for U.S. Appl. No. 11/705,997 dated Feb. 12, 2008,.
Office Action for U.S. Appl. No. 11/705,997 dated Jul. 21, 2008.
Advisory Action for U.S. Appl. No. 11/705,997 dated Oct. 1, 2008.
Office Action for U.S. Appl. No. 11/705,997 dated Feb. 17, 2009.
Office Action for U.S. Appl. No. 11/705,997 dated Dec. 14, 2009.

Alba et al., "Interactive home shopping: Consumer, retailer, and manufacturer incentives to participate in electronic marketplaces", Journal of Marketing, vol. 61, No. 3, Jul. 1, 1997, 18 pgs.

Bloch et al., "On the Road of Electronic Commerce—a Business Value Framework, Gaining Competitive Advantage and Some Research Issues", Mar. 1996, 20 pages.

Brown Janelle, "Pod People Peapod, the online grocery service, sounds great—but can it deliver?" Salon Media Group, Inc., Dec. 17, 1998, 3 pages.

Corcoran, Cathy, "The Skeptic's Guide to on-line shopping. Who has time to shop for groceries? So we gave Peapod a test run." The Patriot Ledger, Quincy, MA, Jul. 7, 1997, 4 pages.

Descartes Licenses Energy V6 Supply Chain Suite to Major Pepsi Bottler . . . News Release, Descartes Systems Group Inc., Waterloo Ontario, Aug. 27, 1998, 2 pages.

Dilger, Karen Abramic, "Warehouse Wonders", Manufacturing Systems, vol. 15, No. 2, Feb. 1, 1997, 4 pages.

Dyson et al., "Electronic Delivery without the Internet (Digital Delivery of Newspapers)", The Seybold Report on Publishing Systems, vol. 25, No. 1, ISBN: 0736-7260, Sep. 1, 1995, 9 pages.

Eckerson, Wayne, "Grocers put stock in EDI to streamline deliveries; New electronic data interchange systems offer a wealth of benefits for retailers and suppliers," Network World, Inc., Aug. 7, 1989, 2 pages.

First Stop—Main Menu, website tour, Peapod, http://web.archive.org/web/19961113150913/www.peapod.com/tour1.html, Nov. 13, 1996, 13 pages.

Frequently Asked Questions, webpages, Peapod, http://web.archive.org/web/19961113150832/www.peapod.com/question.html, Nov. 13, 1996, 2 pages.

"Here's How Peapod Works," webpages, Peapod, http://web.archive.org/web/19961113151243/www.peapod.com/work.html, Nov. 13, 1996, 2 pages.

"Installation and Shopping Tips for the Mac," Peapod Video, 1993, 1 page.

"Introduction to Peapod," webpages, Peapod, http://web.archive.org/web/19961113145506/www.peapod.com/intro.html, Nov. 13, 1996, 2 pages.

Ives et al., "The Information System as a Competitive Weapon", Communications of the ACM, vol. 27, No. 12, Dec. 1984. 9 pages.

Maeglin, Kathy, "Services Take the 'Shop' Out of Shopping for Groceries", The Capital Times, Mar. 20, 1997, 2 pages.

Mai et al., "Consumers' Perceptions of Specialty Foods and the Rural Mail Order Business", 52nd EAAE Seminar—Parma, Jun. 19-21, 1997, pp. 331-348.

Malone et al., "Computers, Networks, and The Corporation," Center for Information Systems Research, MIT, Aug. 1991, 14 pages.

Marsh, Barbara, "Peapod's On-Line Grocery Service Checks Out Success—Customers Shop Electronic Aisles; Finicky Workers Sack the Goods", The Wall Street Journal, Jun. 30, 1994, 2 pages.

Meeker et al., The Internet Retailing Report, U.S. Investment Research, Morgan Stanley, May 28, 1997, 241 pages.

Menzies, David, "Checking out the aisles by computer: Cori Bonina, General Manager of Stong's market in Vancouver, has made a virtual success of a meat-and-potatoes business", National Post, Dec. 1, 1998, 2 pages.

"More Information," webpages, Peapod http://web.archive.org/web/19961113145540/www.peapod.com/more.html, Nov. 13, 1996, 2 pages.

"Online Groceries, A Quicker Shopping Cart?" E-Commerce Customers—What, Where and Why They Buy, Standard Media Inc. and Odyssey, LP, Spring 2000, 19 pages.

Patterson, Rebecca H., "No Lines at Britain's First On-Line Grocery Store, but You Still May Wait", The Wall Street Journal Europe, Jul. 25, 1997, 3 pages.

Peapod, Inc., Telephone Grocery Shopping Guide, Aug. 7, 1992, 3 introductory pages and pp. 1-12.

Podmolik, Mary Ellen, "Groceries Seeing Green From Computer Shopping", Chicago Sun-Times, May 8, 1996, 1 page.

Poirier, Charles et al., Supply Chain Optimization, Building the Strongest Total Business Network, Berrett-Koehler Publishers, San Francisco, Copyright 1996, 30 pages.

Purpura, Linda, "Getting to House from Order Smooth Transitions from Order, To Pick, To Pack, To Delivery, are a Vital Part of a Successful Home-Shopping Program", Supermarket News, Oct. 6, 1997, 2 pages.

Reynolds, Janice, "Logistics and Fulfillment for E-Business", ISBN: 1-57820074-1, 2001, 60 pages.

"Shopping-Virtually Hassle-Free", Computer Weekly, Apr. 10, 1997, 2 pages.

Smart Shopping for Busy People, webpage, Peapod, http://web.archive.org/web/19961113145048/www.peapod.com/ Nov. 11, 1996, 1 page.

User Manual, Peapod, Inc., Version 3.10, Aug. 7, 1992, 83 pages.

Van Mieghem, Jan A., "Peapod: Mass Customized Service", Kellogg School of Management, Northwestern University, Aug. 28, 2001 (Rev. Nov. 22, 2004), 13 pages.

U.S. Appl. No. 12/878,219, filed Sep. 6, 2010.

Chandler, Susan. "The grocery cart in your PC," Business Week, Iss. 3441, 1995, p. 63, 2 pages.

Saccomano, Ann, "Blue Laws' Still Apply," Traffic World, Logistics Section, p. 15, Aug. 23, 1999, 2 pages.

U.S. Appl. No. 11/244,627, filed Oct. 5, 2005.
U.S. Appl. No. 11/191,413, filed Jul. 27, 2005.
U.S. Appl. No. 11/701,206, filed Feb. 1, 2007.
Office Action for U.S. Appl. No. 11/642,328, dated Aug. 3, 2010.
Office Action for U.S. Appl. No. 11/642,328, dated Feb. 4, 2011.
Fielding et al. "Hypertext Transfer Ptotocol—HTTP/1.1, RFC 2616," Network Working Group, Jun. 1999, pp. 1-90.

* cited by examiner

ONLINE STORE PRODUCT AVAILABILITY

CROSS-REFERENCE TO RELATED APPLICATIONS

The application is a continuation under 35 USC 120 of U.S. patent application Ser. No. 09/568,603, now U.S. Pat. No. 7,177,825, entitled INTEGRATED SYSTEM FOR ORDERING, FULFILLMENT, AND DELIVERY OF CONSUMER PRODUCTS USING A DATA NETWORK filed May 10, 2000, the entirety of which is incorporated herein by reference for all purposes, which claims priority under 35 USC 119(e) from U.S. Provisional Patent Application No. 60/133,646 entitled ELECTRONIC COMMERCE ENABLED DELIVERY SYSTEM AND METHOD filed May 11, 1999, the entirety of which is incorporated herein by reference for all purposes.

The present application also relates to a number of commonly assigned, U.S. patent applications including: (1) U.S. patent application Ser. No. 09/568,570, now U.S. Pat. No. 7,370,005, for INVENTORY REPLICATION BASED UPON ORDER FULFILLMENT RATES; (2) U.S. patent application Ser. No. 09/568,614 for REAL-TIME DISPLAY OF AVAILABLE PRODUCTS OVER THE INTERNET; (3) U.S. patent application Ser. No. 09/568,572 (now U.S. Pat. No. 6,975,937) for TECHNIQUE FOR PROCESSING CUSTOMER SERVICE TRANSACTIONS AT CUSTOMER SITE USING MOBILE COMPUTING DEVICE; (4) U.S. patent application Ser. No. 09/568,823, now U.S. Pat. No. 7,197,547, for LOAD BALANCING TECHNIQUE IMPLEMENTED IN A DATA NETWORK DEVICE UTILIZING A DATA CACHE; (5) U.S. patent application Ser. No. 09/568,569 (now U.S. Pat. No. 6,622,127) for ORDER ALLOCATION TO SELECT FROM INVENTORY LOCATIONS STOCKING FEW UNITS OF INVENTORY; (6) U.S. patent application Ser. No. 09/566,912 (now U.S. Pat. No. 6,332,334) for METHOD AND APPARATUS FOR HANDLING AND TRANSPORTING TEMPERATURE-SENSITIVE ITEMS; (7) and U.S. patent application Ser. No. 09/568,571 (now U.S. Pat. No. 7,139,637) for ORDER ALLOCATION TO MINIMIZE CONTAINER STOPS IN A DISTRIBUTION CENTER. Each of the disclosures of these applications is incorporated herein by reference in its entirety for all purposes.

BACKGROUND OF THE INVENTION

1. Field of the Invention

This invention relates to the field of electronic commerce. In particular, the invention relates to a technique for selling and delivering consumer products to customers using a data network.

2. Description of the Related Art

Companies have been delivering goods to customer homes for years using many different kinds of delivery systems. Examples run from mail order catalog shopping to on-line ordering and delivery services such as those provided by Amazon.com and Peapod.com. Indeed, the demand for home shopping and home delivery is increasing. However, many of the conventional systems which provide home shopping and home delivery services have significant limitations that prevent their adoption on a large scale basis.

For example, the on-line grocery delivery service provided by Peapod.com (implemented by Peapod, Inc.) allows customers to access an on-line grocery store to place grocery orders. "Shoppers" (i.e. employees of Peapod) fill the orders by traveling to local grocery stores and purchasing the groceries ordered by the customers. The groceries are then delivered to the customer's home. In order to make a profit on the transaction, Peapod adds delivery charges on to the grocery bill. This makes the groceries more expensive than if the customer had performed the shopping and purchasing himself/herself.

Additionally, when a customer places an order, Peapod can not guarantee that the ordered item will be available to be delivered to the customer. Thus, if the grocery store does not have the ordered item (e.g. out of stock), the "shopper" cannot deliver that item to the customer.

Further, delivery scheduling problems may also arise with on-line shopping services such as those provided by Peapod. Often, it is extremely difficult to fulfill a delivery request for an order to be delivered on the same day that the order was placed. Therefore, many shopping services do not offer this feature. Additionally, it is not uncommon for a scheduled customer delivery window to be missed because the order took too long to fulfill by the "shopper".

In addition to the Peapod technique, there are other conventional on-line techniques which allow a customer to purchase customer products via the Internet, and then have the purchased products delivered to a customer's shipping address. For example, on-line retailers such as Amazon.com, Inc. provide the ability for a customer to select and purchase various products via the Internet or World Wide Web. Using conventional techniques, an on-line product purchasing transaction will typically include the following steps.

First, the customer selects one or more products to be purchased. Once the customer has finished selecting the desired product(s), the customer may then proceed to a check-out or order confirmation page. During the check-out or order confirmation process, the customer provides the necessary information for completing the transaction purchase, such as, for example, the customer's name, credit card number, shipping address, etc. Before the order is confirmed by the on-line retailer, (e.g., Amazon.com), the billing and financial information is verified and processed. For example, if a credit card is used by the customer to purchase selected on-line products, a credit card transaction for the total amount of the purchase will be authorized before the purchase order is confirmed and fulfilled by the merchant. Once the payment transaction has been authorized, the on-line merchant typically fulfills the order by obtaining the purchased products, and shipping the purchased products the customer's shipping address using a common carrier (e.g. third-party courier) such as, for example, UPS, USPS, Federal Express, etc. The customer's credit card is typically billed at the time of shipment.

Although the above-described on-line product purchasing technique provides the convenience of allowing a customer to purchase and receive a desired product without having to venture outside his or her home, current on-line shopping techniques suffer from a number of additional disadvantages (in addition to those described previously). For example, many on-line merchants provide adequate customer service relating to on-line product purchases, but typically provide inadequate customer service for handling returns or customer complaints. Further, once the customer's order has been processed, a customer typically does not have the ability to change, alter, or cancel the order. Rather, the customer must typically wait until he or she receives the originally ordered goods, and then must make a subsequent request to the on-line merchant for returning or modifying at least a part of the order. This latter request is typically handled as a separate transaction on the merchant's side, and may involve lengthy delays. Additionally, if the customer wishes to return one or more products, the customer is typically required by the merchant to first obtain a return authorization number (after first submitting a return request), and typically is responsible for paying shipping costs for shipping the returned products back to the merchant.

The following example may help to illustrate some of the potential problems which a customer may encounter when purchasing products via on-line retailers or merchants. First, let us assume that a customer has selected two books for purchase using an on-line merchant, such as, for example, Amazon.com. When the customer proceeds to the check-out page, the customer authorizes a total amount (i.e., for the books, tax, and shipping) to be billed to his or her credit card. Once the credit card authorization for the total amount has been received, the merchant fulfills the order and forwards the order to a common carrier for shipment. The customer's credit account will be billed at this time for the total amount specified above.

After the order has been fulfilled by the merchant, the customer is typically unable to modify or cancel the order. Thus, for example, if the customer subsequently wishes to cancel one of the ordered books after the merchant has fulfilled the order, the customer must first wait to receive the book, and then submit a separate request to the on-line merchant for returning the book. It is worth noting that since the purchased items are typically shipped using an independent courier service or common carrier such as UPS, Federal Express, or the U.S. postal service, there is no mechanism in place whereby the customer is able to return the undesired product (e.g., book) back to the delivery courier for an immediate refund. Rather, as is typically the case, the customer must first obtain a return authorization number from the merchant, re-package the unwanted product, and ship the unwanted product back to the merchant. Typically, the customer is required to pay for shipping charges for returning a product, even if the product was received in a defective condition.

Once the returned product is received by the merchant, it is typically processed within four to six weeks, meaning that a credit for the returned product may not be issued to the customer until four weeks after the product has been received by the merchant. In the example above, a credit, when issued, may appear as a refund or a credit on the customer's credit card account.

An additional problem with conventional on-line purchasing transactions relates to merchandise availability. For example, when a merchant receives a request for a product return, the merchant is not able to include the returned product as part of the merchant's current inventory until the returned product is physically received at the merchant's site and the return processed, which may take up to 4 to 6 weeks. Moreover, until the returned order is processed, the returned merchandise will typically not be included as part of the inventory made available for customer purchase. This results in an inefficient allocation of resources.

In light of the above, there exists a continual need to improve upon electronic commerce and on-line purchasing techniques.

SUMMARY OF THE INVENTION

According to specific embodiments of the present invention, a technique for effecting electronic commerce using a data network is described. The data network includes a plurality of subsystems which, together, form an integrated system for receiving customer orders for selected items via a data network, fulfilling the customer orders, and delivering the ordered products to the customers. Moreover, according to a specific embodiment, the integrated nature of the system architecture of the present invention allows the on-line merchant to provide a guarantee to the customer that the ordered items will be available to be delivered to the customer at the specified window delivery time.

According to a specific embodiment, an integrated system is disclosed for effecting electronic commerce via a data network. The system comprises an inventory subsystem comprising memory. The inventory subsystem includes an inventory database configured or designed to maintain inventory records of a plurality of items of merchandise. The system also includes a customer interface subsystem in communication with the inventory subsystem. The customer interface subsystem is configured or designed to store available inventory information, and is also configured or designed to present selected item information relating to the inventory merchandise to at least one customer via the data network. The customer interface subsystem is further configured or designed to facilitate customer shopping transactions, and to store customer order information. The integrated system also comprises an Order Fulfillment Subsystem in communication with the inventory subsystem. The Order Fulfillment Subsystem is configured or designed to receive customer order information captured by the customer interface subsystem. The order information includes at least one customer order for at least one item. The Order Fulfillment Subsystem is also configured or designed to facilitate fulfillment of the customer order. In a specific embodiment, fulfillment of a customer order includes obtaining at least a portion of the items relating to the order and preparing the obtained items for shipment to the customer. Additionally, the integrated system includes the delivery subsystem in communication with the customer interface subsystem and the inventory subsystem. The delivery subsystem is configured or designed to receive items relating to at least one fulfilled customer order, and is also configured or designed to facilitate delivery of the received items to the customer.

An additional aspect of the above embodiment provides that the system further comprises a Publishing Subsystem in communication with the inventory subsystem and the customer interface subsystem for managing item and catalog data associated with a plurality of items of merchandise. Another aspect of this embodiment provides that the customer interface subsystem comprises a capacity database for managing capacity data associated with each of the plurality of subsystems. According to one embodiment, the capacity data includes available capacity data for each subsystem and reserved capacity data for each subsystem, wherein the reserved capacity data is related to placed customer orders which have not yet been delivered to the customer. The customer interface subsystem may also be configured or designed to manage the inflow of customer orders at the time of ordering, using the capacity data.

An alternate embodiment of the present invention is directed to a method for effecting electronic commerce via a data network. The data network comprises a customer interface subsystem for facilitating ordering transactions of items selected by at least one customer; an Order Management Subsystem for managing customer orders, and for managing inventory stock and inventory data; an Order Fulfillment Subsystem for facilitating fulfillment of customer orders; and a delivery subsystem for facilitating delivery of customer orders to the customers. A customer order is received at the customer interface subsystem. The customer order includes information relating to at least one ordered item, and includes information relating to a specified delivery window time. Information relating to the customer order is sent to the Order Fulfillment Subsystem after a pre-determined cut-off time has passed. At least a portion of the customer order is fulfilled at the Order Fulfillment Subsystem. The fulfilling of an order includes verifying each inventory item which has been successfully fulfilled and processed for shipment to the customer. The delivery subsystem is then used to deliver the fulfilled order items to the customer. At the time of the delivery of the fulfilled order to the customer, a record is generated of each item being received by the customer. After the order has been delivered to the customer, the customer is then billed for the order. An additional aspect of this embodiment provides that the customer is able to modify the customer order at the time of delivery of the order to the customer. In a specific embodiment, the modification of a customer order which is initiated during delivery of the order to the customer may be processed by the delivery courier using a mobile field device which has been configured or designed to process and store customer order data. Additionally, using the mobile field device, the delivery courier may process, at the time of delivery, other customer service requests such as, for example, customer returns, credits, or other adjustments.

An alternate embodiment of the present invention is directed to an integrated architecture system for effecting electronic commerce via a data network. The system comprises a customer interface subsystem for presenting representations of selected products to customers via the data network. The customer interface subsystem is also configured to enable customers to generate orders for any of the selected products via the data network. The system further comprises an inventory subsystem in communication with the customer interface subsystem. The inventory subsystem may be configured to maintain and control inventory data related to products presented to the customers. The system may further comprise an order fulfillment subsystem in communication with the inventory subsystem, which is configured to process customer orders via the data network. The system may further comprise a transportation subsystem in communication with the customer interface subsystem and order fulfillment subsystem. The transportation subsystem may be configured to schedule deliveries and manage transportation resources related to the fulfillment and delivery of customer orders. Each of the subsystems of the integrated system architecture may effect its various functions via the data network by interacting with at least one other of the subsystems.

Another embodiment of the present invention is directed to an integrated system for effecting electronic commerce via a data network. The system comprises a first business unit for servicing a first plurality of customers associated with in a first geographic area; a second business unit for servicing a second plurality of customers associated with a second geographic area; and a central management unit for managing information content presented by each of the business units to its respective customers. Further, each of the business units may comprise an inventory subsystem, a customer interface subsystem, an order fulfillment subsystem, and a delivery subsystem. According to a specific embodiment, the integrated system may be configured to route a particular customer to an appropriate business unit based upon the geographic location associated with that particular customer.

Additional features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

According to specific embodiments of the present invention, a technique is described for effecting electronic commerce via a data network. More specifically, the technique of the present invention utilizes an integrated system architecture for effecting electronic commerce via the data network. The data network may be comprised of a plurality of separate networks including wide area networks (WANs), local area networks (LANs), the Internet, etc.

The integrated system architecture of the present invention may be used to implement a variety of electronic commerce techniques. For example, according to a specific embodiment, the integrated system architecture of the present invention may be used to implement an on-line store which may be accessed by customers via the Internet or World Wide Web. Using the technique of the present invention, the on-line store may be configured to facilitate customer transactions, including, for example, providing customers with catalog information relating to items which are available for purchase; enabling customers to schedule a delivery destination, date, and time for delivery of an order; receiving and managing customer orders; facilitating fulfillment of the customer orders; facilitating delivery of the customer orders; etc. The on-line store may include a plurality of systems, subsystems and/or components for interfacing with customers via the data network.

Customer orders received at the on-line store may be forwarded to a physical distribution center, where the orders are fulfilled and processed for shipment to the customers. Once an order has been processed for shipment to a customer, a delivery system may be used for delivering the order to the customer at the specified delivery date and time. According to a specific embodiment of the present invention, the integrated system architecture also includes system elements for managing the fulfillment and delivery aspects associated with electronic commerce transactions.

Figure 1:
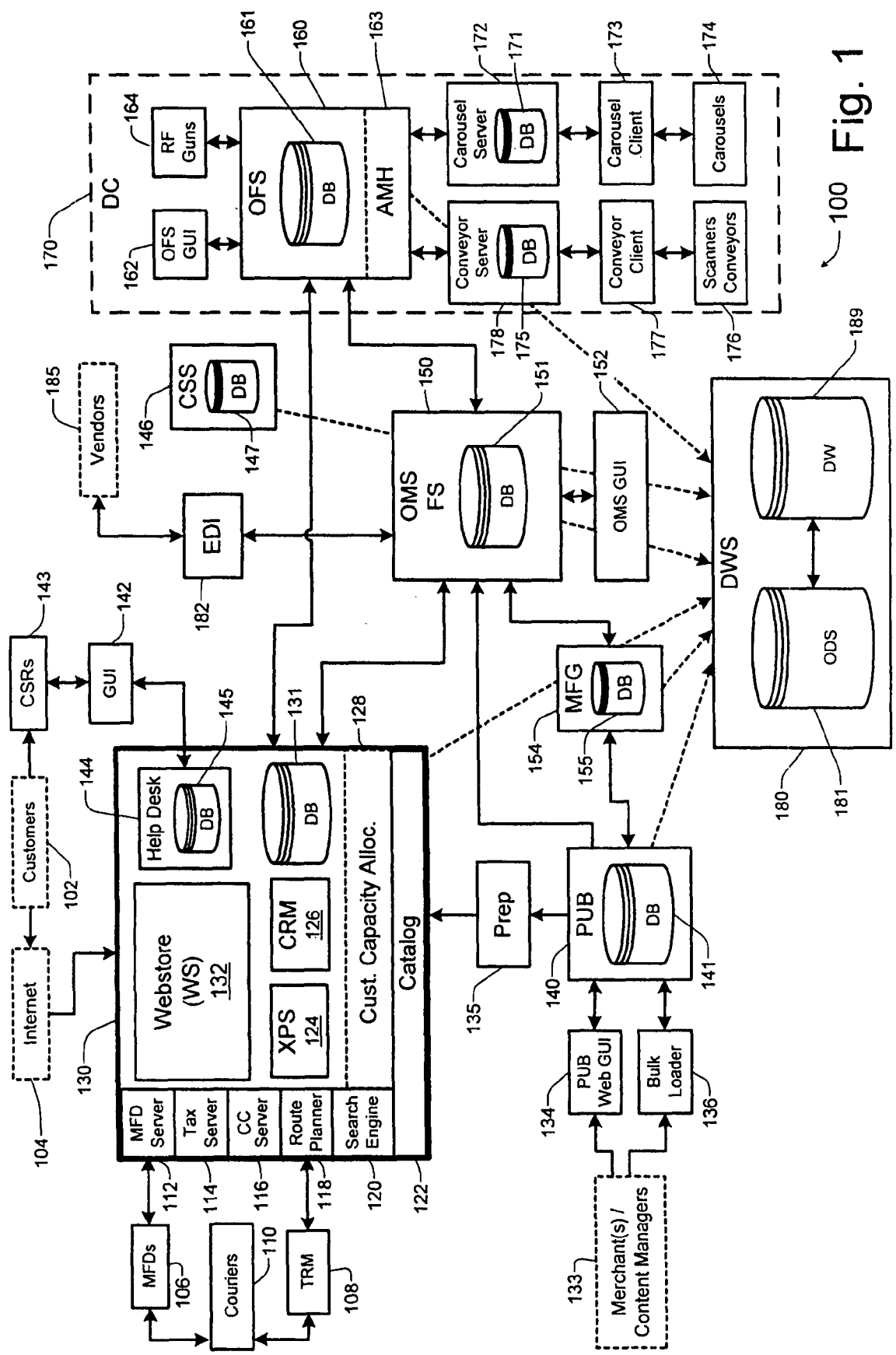
FIG. 1 shows a schematic block diagram of an integrated system architecture 100 in accordance with a specific embodiment of the present invention.

FIG. 1 shows a schematic block diagram illustrating various systems, subsystems and/or components of the integrated system architecture 100 in accordance with a specific embodiment of the present invention. As shown in FIG. 1, system 100 includes a plurality of subsystems and other components for effecting electronic commerce over a data network. A brief description of at least a portion of the plurality of subsystems of system 100 is presented below. For example, system 100 of FIG. 1 may include:

(1) a Publishing (PUB) Subsystem 140 which manages SKU and catalog information (e.g. SKUs, UPCs, products, categories, descriptive attributes, etc.), and provides an interface to merchants 133;

(2) a Webstore Subsystem (WS) 132 which manages the on-line store interface with customers, including customer shopping and ordering transactions;

(3) a Transportation Subsystem (XPS) 124 which manages delivery window scheduling, delivery vehicle routing, capacity planning, and mobile field device (MFD) data used by delivery couriers;

(4) an Order Management Subsystem (OMS) 150 which manages pricing data, item availability data, inventory data, vendor data, finance, procurement, etc;

(5) a Corporate Support Subsystem (CSS) 146 which manages financial and human resource information, and communicates with other subsystems for authenticating users and assigning roles;

(6) an Order Fulfillment Subsystem (OFS) 160 which facilitates the fulfillment of customer orders and manages the distribution center (170) operations;

(7) a Customer Relationship Management (CRM) Subsystem 126 for enabling customer service representatives (CSRs) 143 to service customer requests and track customer interaction;

(8) a Food Production Management Subsystem (MFG) 154 which manages information and purchasing requirements relating to recipes, sub-recipes, ingredients, menus, food safety procedures, equipment usage, etc.;

(9) a Data Warehouse Subsystem (DWS) 180 for storing and analyzing data reported from other subsystems of the integrated system; and

(10) an Electronic Data Interchange (EDI) Subsystem 182 which provides an interface to vendors 185, and manages vendor purchase order and invoice data.

Alternate embodiments of the integrated system of the present invention may also include:

(11) an Automated Call Distribution (ACD) Subsystem which manages and routes customer calls as they are received at a customer service call center;

(12) a Network System Management (NSM) Subsystem which monitors and diagnoses all networks and subsystems in the system 100;

(13) a System and Network Infrastructure (SNI) Subsystem which may include hardware and/or software for optimizing network performance, scalability, and reliability;

(14) a Corporate Networks and Systems (CNS) Subsystem which represents the underlying network foundation upon which corporate systems run; and

(15) a Content Management Subsystem (CMS) for managing the catalog content of a plurality of on-line stores which utilize the integrated system of the present invention.

As shown in FIG. 1, system 100 may include at least a portion of the above-described subsystems. Additionally, each subsystem may also comprise at least one server and/or other components. Further, each subsystem may be configured to utilize a dedicated or shared database server as its persistent and transactional data backbone. Users or customers may access data stored on one of the subsystem's database servers (e.g. Webstore database), which then executes appropriate business logic and/or business objects.

Each subsystem may be configured or designed to communicate with each other via a plurality of interfaces. According to a specific embodiment, the plurality of interfaces includes both synchronous and asynchronous interfaces. Many of the various system interfaces are configured to be asynchronous, wherein data is typically transferred in batch mode via staging (e.g. database) tables or flat files (e.g., separated value files). However, at least a portion of the system interfaces are configured as synchronous interfaces. Generally, a synchronous interface may be used where an immediate response from a server or component is required. Synchronous interfaces in the system 100 of FIG. 1 may exist between WS 130 and XPS 124, XPS 124 and Route Planner 118, WS 130 and Tax Server 114, and MFD server 112 and Tax Server 114.

Conceptually, the system 100 of FIG. 1 may be grouped into two general subsystems, namely a Front Office system and a Back Office system. The Front Office system is generally responsible for functions related to customer transactions such as, for example, customer orders, billing transactions, delivery scheduling, customer service, etc. In the embodiment of FIG. 1, for example, the Front Office system 130 comprises the Webstore Subsystem 132, Transportation Subsystem 124, and Customer Relationship Management Subsystem 126. The Front Office system 130 may also include other subsystems or components such as, for example, mobile field device (MFD) components 112, a tax component 114, a credit or debit card billing component 116, a delivery route planning component 118, a search engine 120, a catalog component 122, a Help Desk component 144, etc. The above-described subsystems and components of Front Office 130 are described in greater detail below.

Additionally, the Front Office system 130 may include a centralized database 131 which may be accessed by subsystems and/or components of system 100. Alternatively, one or more of the Front Office systems and/or components may each comprise a respective database which is accessible by other subsystems and/or components of system 100.

The Back Office system generally includes all subsystems and/or components which are not part of the Front Office system. Thus, as shown in FIG. 1, for example, the Back Office system includes the PUB 140, MFG 154, OMS 150, EDI 182, CSS 146, DWS 180, and OFS 160 subsystems. However, the invention is not limited to the particular embodiment shown in FIG. 1, and it will be appreciated that the specific configuration of system 100 may be modified by one having ordinary skill in the art to suit specific applications.

Subsystem Functionality

This section provides a more detailed description of the various subsystems and components which form the integrated system architecture of the present invention, as shown, for example, in FIG. 1 of the drawings.

Publishing Subsystem (PUB)

Referring to FIG. 1, the Publishing Subsystem 140 maintains and manages information data about the retail objects (e.g. SKUs, products, categories, etc.) which may be available for customer purchase.

Each different item of inventory is associated with a respective stock keeping unit or SKU, regardless of whether the item is available for customer purchase. A product is a grouping of SKUs. The product information is the higher level information that is pertinent to all SKUs in the grouping. A category is a hierarchical classification based on how customers would expect products to be logically grouped. For example, the category "potato chips" may include the products "Brand X" potato chips and "Brand Y" potato chips. Further, the Brand X potato chip products may include a 16-ounce Brand X potato chips item (associated with a first SKU) and a 20-ounce Brand X potato chips item (associated with a second SKU).

The PUB Subsystem 140 may maintain and manage a master catalog of all SKU information, including production and supply only SKUs. Additionally, PUB Subsystem 140 may also generate and manage different catalogs for different on-line stores. Each store catalog may include a selected subset of SKUs from the master catalog.

As shown in FIG. 1, the Publishing Subsystem includes a database 141. According to a specific embodiment, the PUB database may be implemented using an Oracle database running on a database server. The database is used as a repository of all publishing data as well as the repository of code that implements predefined business rules.

The data stored within the PUB database 141 may be grouped into a plurality of different schemas, including, for example, a data entry schema where all changes are initially stored; an integration schema in which changes from at least one user are integrated; a master schema which stores a master copy of all retail objects; a catalog schema which may be configured as an outbound staging area used by the other subsystem interfaces; a publication utility schema which includes stored procedures and views which may be implemented by the predefined business rules; a publication API schema for allowing both internal and external clients to connect to the PUB database; etc.

Merchants and content managers may enter and maintain SKU information stored in the PUB database using the PUB Web GUI interface 134 and PUB Bulk Loader interface 136. The SKU information may include SKU attribute values such as, for example, UPCs, vendors, categories, category hierarchy, images, articles, descriptive information, etc. The PUB Web GUI interface 134 allows merchants to edit SKU information, products, and/or categories. The PUB Bulk Loader 136 supports the processing of data files from outside the PUB Subsystem into the PUB database 141. According to a specific embodiment, the PUB Bulk Loader is configured to allow merchants to upload a variety of data file types into the PUB database including flat data files, and image files. The Bulk Loader processes the flat file information to create appropriate database records for the PUB catalog.

Figure 9:
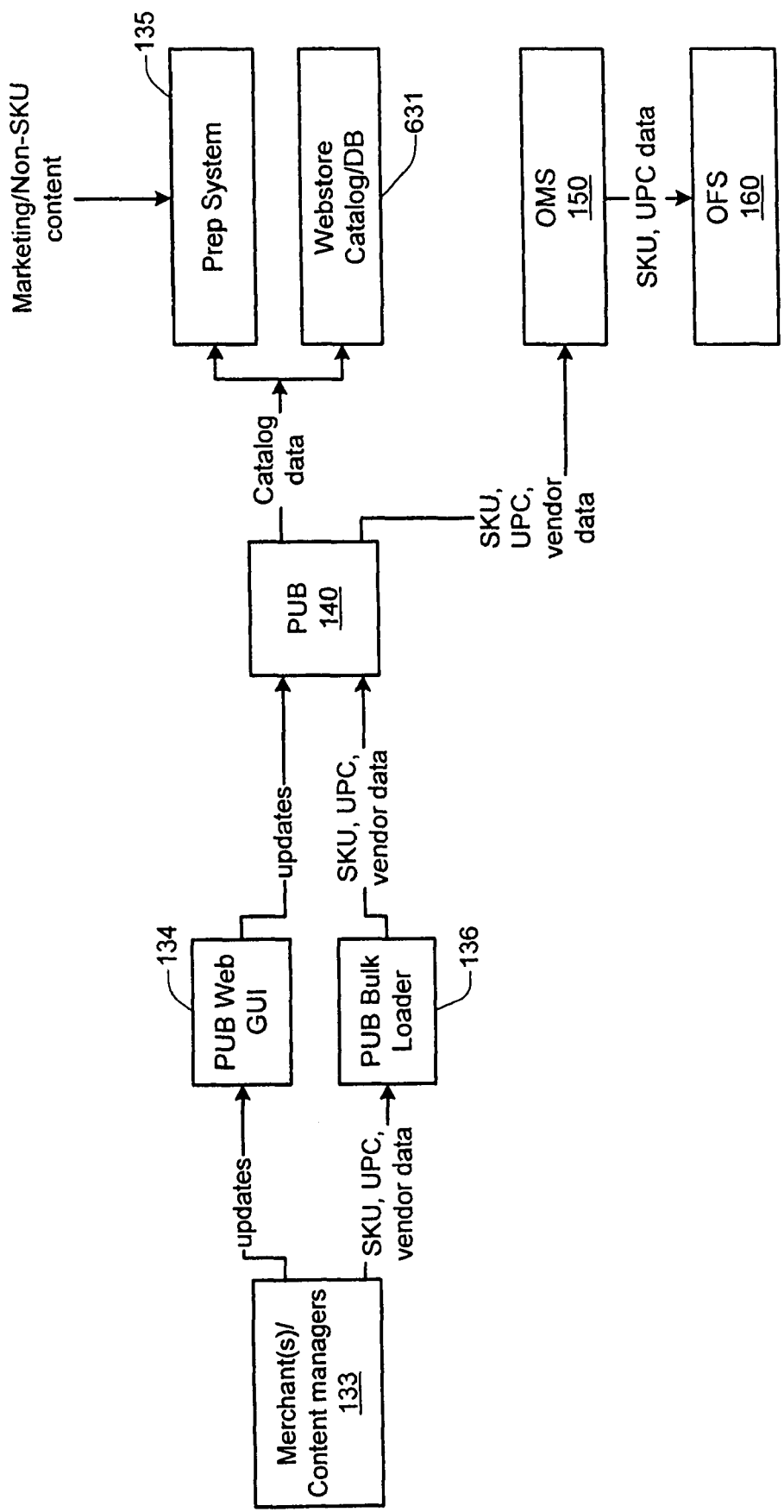
FIG. 9 illustrates various SKU and catalog flows in accordance with a specific embodiment of the present invention.

FIG. 9 illustrates SKU and catalog data flow between various subsystems of a specific embodiment of the present invention. As described previously, merchants and/or content managers may enter and maintain SKU information in the PUB Subsystem using either the PUB Web GUI 134 or PUB Bulk Loader 136. The processed SKU information is then forwarded to the PUB Subsystem and stored in the PUB database 141. According to a specific embodiment, a PUB Subsystem exports SKU information that is relevant for selling using a catalog export file. This catalog export file may be first validated by a Prep System 135. The Prep System may be configured to be a separate but identical instance of Webstore 132, which includes an associated database. In addition to validating the catalog export file, the Prep System 135 may also serve as a final integration checkpoint for all non-SKU content that is generated by marketing. Once the catalog export file has been validated by the Prep System, the Webstore Subsystem 132 is free to import the catalog export file into its database 131. This may be done on a periodic basis, such as, for example, on a daily basis during a regularly scheduled downtime.

The SKUs which are included in the catalog export file are ones which the Webstore may display and offer for sale to customers. According to an alternate embodiment, the PUB Subsystem may generate a plurality of catalog export files, including, for example, a master catalog export file comprising all known SKU information, and separate store catalog export files (e.g., grocery store, convenience store, specialty store, etc.), each of which including only a portion of the SKU information included in the master catalog.

According to a specific embodiment, the PUB Subsystem ensures that any exported data is consistent and follows certain conventions such as, for example, ensuring that no empty leaf categories are exported. In this embodiment, the Webstore Subsystem does not need to perform run-time checks on the exported data, and is therefore free to speed up the display of the SKUs, products and categories to the customer.

Periodically (e.g., minutes, hours, days) the OMS polls the PUB database for new and updated SKU information, and stores the retrieved data into the OMS database 151. According to a specific embodiment, OMS maintains available-to-promise (ATP), price, and inventory (e.g., replenishment and purchasing) information for each SKU. OMS may also capture and/or manage sales and shipment data relating to each SKU. Periodically, OMS passes new and updated SKU information it acquires from the PUB Subsystem to the OFS. The SKU information may be used by OFS, for example, to maintain physical inventory and fulfill orders.

Front Office Architectural Layers

As shown in FIG. 1, the Front Office 130 comprises a plurality of separate subsystems such as, for example, Webstore Subsystem (WS) 132, Transportation Subsystem (XPS) 124, and Customer Relationship Management (CRM) Subsystem 126. Each subsystem may be implemented via a combination of hardware and/or software, and further may include a plurality of different functional components, modules, and/or plug-in applications.

At least a portion of the software residing at the Front Office system may include a presentation layer, an application layer, a business object layer, a database access layer, or any combination thereof. According to a specific embodiment, the presentation layer handles the actual presentation of information to users via an appropriate medium. The application layer, which may be stateless, handles the appropriate application logic for the various subsystems of the Front Office. For example, in the Webstore Subsystem 132, it is the application layer (referred to as the shopping engine) which determines that a customer cannot check out an order unless the customer has selected a delivery window, or provided billing information. The business object layer, which may be stateful, provides objects with a fixed set of functionality (e.g. methods or procedures) that may be manipulated by the application layer. The business object layer may also implement write through caching of data. According to a specific embodiment, the business objects do not know about each other, and the application layer handles the coordination between the various business objects. The database access layer provides connectivity and data access APIs to the Front Office database 131 (also referred to as the Webstore database). According to a specific embodiment, the database access layer performs pooling and caching of connection objects, where appropriate.

It is also important for a common database schema to be adopted by each of the Front Office systems. According to a specific embodiment, the database 131 is implemented as a shared database which may be accessed by each of the Front Office systems.

Webstore Subsystem (WS)

The Webstore Subsystem (WS) 132 provides an interface for enabling customers to access the on-line store (e.g. Webstore). In a specific embodiment where the Webstore is implemented as a website on the World Wide Web, customers may access the Webstore via the Internet or World Wide Web using any one of a plurality of conventional browsers. The Webstore user interface may be designed to provide a rich set of functions without requiring any special browser plug-ins. Thus, according to a specific embodiment, customers may access the Webstore using any client machine, regardless of the machine's operating system platform. Additionally, for security purposes, the Webstore interface also supports data encryption for exchange of any sensitive or private information between the customers and the website. According to a specific embodiment, the secure Webstore interface is implemented using a secure http protocol (HTTPS), commonly known to those of ordinary skill in the art.

In accordance with a specific embodiment, the Webstore Subsystem 132 supports a number of customer related features such as, for example, self registration; accessing of customer account information; browsing of product categories and category hierarchy; viewing of product images and product information; keyword searches; delivery scheduling; accessing of customer order history; customizable shopping lists; on-line shopping and ordering; etc.

The Webstore Subsystem (referred to as the Webstore) may be implemented using at least one server which is connected to the data network. According to a specific embodiment, the Webstore is implemented using a plurality of web servers (e.g. web server farm) which helps to minimize server response time and provide real-time failover and redundancy capabilities. Further, according to a specific embodiment, in order to keep the web server response time to a minimum, the Webstore may be configured such that all processing is performed on a single server, within one process. Where a plurality of Webstore servers are used, redundant processing may be performed by at least a portion of the servers so that a single Webstore server may handle all Webstore processing tasks associated with a particular on-line customer. It will be appreciated that the Webstore server boundaries may be crossed where appropriate, such as, for example, when accessing the Front Office database via the data network.

According to a specific implementation, the presentation layer of the WS software is implemented in Microsoft Active Server Pages (ASPs) which generates HTML data that is sent back to the customer browser. The application software layer or shopping engine layer may be implemented as Microsoft Component Object Model (COM) objects. The business object layer of the software may provide the following business objects: (1) a customer object which implements customer functionality and attributes; (2) a catalog object which implements the product category hierarchy, SKUs, price, and available-to-promise (ATP) information; (3) an order object which implements the shopping cart, order management, billing, and check-out procedures; (4) a session object which implements state over HTTP; and (5) a delivery object which implements customer delivery scheduling. Further, the WS is preferably configured or designed to minimize customer response time and to provide for scalability. In an alternate embodiment, the presentation layer could be implemented using Java and/or Perl, and the application software layer may be implemented using NSAPI or Apache modules.

Additionally, as shown in FIG. 1, the Front Office system may include a number of integrated components which provide additional functionality. For example, the WS may include a plurality of components which provide additional functionality such as, for example, computation of taxes, search capability, credit card billing, etc. Thus, as shown in FIG. 1, for example, the WS 132 includes at least one catalog component 122; a tax computation component 114 for computing taxes for each order line item that is sold; a search component 120 for processing text search requests; and a credit (or debit) card server (CC) component 116 for handling credit and/or debit card authorizations and funds captures. According to at least one embodiment, one or more of these components may be implemented as an asynchronous process in order to reduce or minimize impact on the Webstore server's response time and availability.

Transportation Subsystem (XPS)

The Transportation Subsystem (XPS) 124 generally handles delivery window scheduling, delivery vehicle routing, capacity planning, and mobile field device programming used by delivery couriers. Accordingly, the Transportation Subsystem may be configured to provide the following functional features: (1) delivery scheduling, and delivery window reservation; (2) deliveries to customer site with appropriate billing actions and processing, including processing of adjustments, credits, and returns; and (3) adjusting delivery operation parameters such as, for example, truck route plans, delivery vehicle usage, service duration, parking time, delivery courier scheduling, data to be downloaded into MFDs, etc.

As shown in FIG. 1, for example, the Transportation Subsystem 124 may comprise a plurality of components and/or other subsystems including, Route Planner 118, MFD server 112, mobile field devices 106, transportation resource management (TRM) software 108, and couriers 110. In alternate embodiments, at least a portion of these components such as, for example, the MFD server 112, may be implemented as a separate subsystem and may reside external to the Transportation Subsystem.

Route Planner 118 provides an interface to access the transportation resource management (TRM) software 108. According to a specific embodiment, the TRM component may be implemented using a Scheduling and Optimization Component (SOC) software package such as that manufactured by Descartes Systems Group. of Onterio, Canada. According to a specific embodiment, the TRM component may keep track of the current state of all delivery windows which may be organized according to a per-zone basis. Delivery vehicles may be assigned to zones as part of the delivery planning. The Route Planner 118, working in conjunction with TRM 108, allocates specific routes and stops to specific delivery vehicles. Preferably, a stop will be scheduled for a particular customer within that customer's selected delivery time window.

One function of the Transportation Subsystem is to generate a list of available delivery windows (for presentation to the customer) based upon transportation capacity data such as, for example, the number of couriers available, the number of delivery vehicles available, the number of orders for a particular day, truck routes, etc.

In at least one embodiment, the Transportation Subsystem 124 also includes a zone window creator component which creates delivery window time schedules for each day, and creates window templates for use by the Webstore Subsystem. The Transportation Subsystem may also include a Delivery Window Estimator component which determines which delivery window times are reserved and which delivery window times are available for reservation by a customer. Using the data generated from the Delivery Window Estimator, the Webstore may then display the reserved and available delivery windows to the customer.

According to an alternate embodiment, a delivery business object in the Webstore Subsystem estimates and caches information about availability of delivery windows on a per-zone, per-subzone, and per-customer basis. When a customer requests to view available delivery windows, the delivery business object uses the customer delivery address data and the current set of van routes and stops for that zone to estimate and present to the customer available delivery window time slots. According to a specific embodiment, the available delivery window information is presented to the customer using a delivery window grid.

When a customer selects a delivery window, the delivery window business object submits the request to the Transportation Subsystem's Route Planner 118. The Route Planner then performs a verification check to verify that the selected delivery window can be promised to the customer. According to a specific embodiment, the delivery business object continually adjusts its view of the delivery world in order to achieve a less than 1% of estimation failures.

According to a specific embodiment, the Transportation Subsystem may include a plurality of Route Planners which are each configured to run concurrently. Each Route Planner may be able to allocate or schedule deliveries for a set of zones. According to one embodiment, no zone may be serviced by more than one Route Planner. In the event that a Route Planner fails, (e.g. due to hardware failures), the Transportation Subsystem may be designed or configured to cause a different Route Planner to take over the delivery scheduling for the set of zones handled by the failed Route Planner. In one embodiment the failover operation may be performed manually, while in another embodiment the failover operation may be performed automatically in response to the failure detection.

Dispatch Subsystem

According to at least one embodiment, the Transportation Subsystem may include a Dispatch Subsystem (not shown in FIG. 1) for allowing real-time access to the state and/or status of delivery couriers and delivery vehicle resources. Using the Dispatch Subsystem, dispatchers may communicate with delivery couriers that are en-route, and may also use the Dispatch Subsystem to provide real-time re-scheduling of delivery routes. According to a specific embodiment, the Dispatch Subsystem may be implemented using the TRM component.

Mobile Field Device (MFD) Subsystem

Although the MFD server 112 may conceptually be grouped with the Transportation Subsystem, in a specific embodiment, the MFD server component 112 may configured to include at least one back-end server which resides in a particular area data center. Thus, different areas may be serviced by different MFD servers. Moreover, each zone in a particular area may serviced from a station which may be connected to the area data center via the data network. Each mobile field device (MFD) unit or client 106 may communicate with an area MFD server 112 via the data network, and download and/or upload various types of information, including, for example, customer order history information, delivery information (e.g. vehicle delivery routes, stops, etc.), customer returns information, credits, adjustments, etc.

According to a specific implementation, each delivery courier carries an MFD device while making his or her delivery run to the customer sites. Each MFD device may be configured to communicate via a wireless communication system with an MFD server. For example, the MFD device may include a radio transponder which communicates with a radio transceiver for communicating with an MFD server. In this embodiment, it is possible for the MFD device to immediately transmit to the MFD server any desired data which the MFD device captures and/or generates while in the field. For example, the MFD device may transmit the arrival and departure times of the delivery courier at specific customer stops in real-time. Using this information, a dispatch operator is able to automatically track the status of selected delivery couriers in the field. Further, according to a specific embodiment, when the communication link between the MFD device and the MFD server is broken, the MFD device is able to store all processed data which it collects and/or generates in the field and subsequently transmit, via a batched process, the stored data to the MFD server when the communication link to the MFD server is re-established. Further, it will be appreciated that the MFD device may be configured to fully perform all functions and operations at times when the MFD device is unable to communicate with the MFD server.

During delivery, the MFD device 106 may be configured to provide the delivery operator or courier with delivery route information, including delivery routes and stops. Additionally, the MFD device may also be configured to verify delivered items upon delivery. Further, using the MFD, the delivery courier is able to immediately process a variety of customer service requests at the customer site (e.g. at the time of delivery to the customer), such as, for example, order modifications, customer returns, billing adjustments, inventory adjustments, credits, etc. According to a specific embodiment, the MFD device is able to process these various customer service requests using data stored within the device, which has been downloaded into the MFD unit prior to the delivery. Thus, according to this embodiment, the MFD device does not communicate with the MFD server while processing the customer service requests at the delivery sight. Alternatively, however, the MFD device may be configured to communicate with the area MFD server during processing of the customer service request using any one of a number of standard mobile communication techniques such as, for example, RF data systems, cellular data systems, etc. In this latter embodiment, the MFD device may be configured to allow processing of customer service requests, even at times when the MFD device is temporarily unable to communicate with the MFD server.

After the MFD has processed all appropriate transactions at the customer delivery site (including verification of current ordered items received by the customer), the MFD may also be configured or designed to provide the customer with an adjusted billing receipt (i.e. zero balance receipt), showing a total amount to be billed which takes into account any billing adjustments related to any processed returns, credits, adjustments, etc.

After completing deliveries on the delivery route, the courier, upon returning to the station, may connect the MFD device 106 to the MFD server 112, and upload all of the processed field transactions into the area data center, where it is then processed and stored in the Front Office database 131. The uploaded MFD data may also include the times at which the delivery events occurred.

According to a specific embodiment, the customer is not billed for the delivered order until after the order has been delivered and the MFD data relating to the delivery has been received at the Front Office system. The customer will then be billed for the adjusted total amount to be billed, indicated on the adjusted billing receipt (which was presented to the customer at the time of delivery). In this way, the customer will know, at the time of delivery, all charges for which the customer will be billed.

Customer Relationship Management (CRM) Subsystem

The Customer Relationship Management Subsystem 126 is an interactive application which may be used by customer service representatives (CSRs) 143 to manage customer service requests and to track customer interaction. The functionality provided by the CRM subsystem may include, for example, accessing customer information; issuing credits for various customer issues (e.g. complaints, returns, damaged goods, etc.); handling work flow for processing customer issues; etc. The CRM subsystem provides CSRs (sometimes referred to as customer service operators—CSOs) with the ability to access, view, and edit customer information in accordance with customer requests.

The general architecture of the CRM Subsystem is similar to that of the Webstore Subsystem. For example, in a specific embodiment, the CRM subsystem may use the same application, business object, and database access layers which is used by the Webstore Subsystem.

In the embodiment shown in FIG. 1, the CRM subsystem comprises a Help Desk component 144. In a specific implementation, the Help Desk component is implemented using a Remedy software package, manufactured by Remedy Corp., of Mountain View, Calif. The Help Desk component manages any workflow for handling specific customer requests or issues. For example, the Webstore and Transportation Subsystems may generate trouble tickets for various events such as, for example, failed credit card authorizations or customer-reported shorts in delivery. The CSRs process these trouble tickets via the Help Desk component 144 of the CRM subsystem. Utilizing the Help Desk component, the CSRs are able to initiate and track any customer contact relating to the processed trouble tickets. The CSRs may access the Help Desk component 144 via a Help Desk GUI 142.

According to a specific embodiment, the Help Desk component includes a database 145 for managing customer service requests and/or issues. Alternatively, the Help Desk component may be configured to share the Front Office database 131.

Order Management Subsystem (OMS)

The Order Management Subsystem (OMS) 150 manages a variety of aspects related to the integrated system architecture of the present invention, including, for example, pricing, availability, inventory, vendors, financials, procurement, and data flows between various subsystems.

Figure 7A:
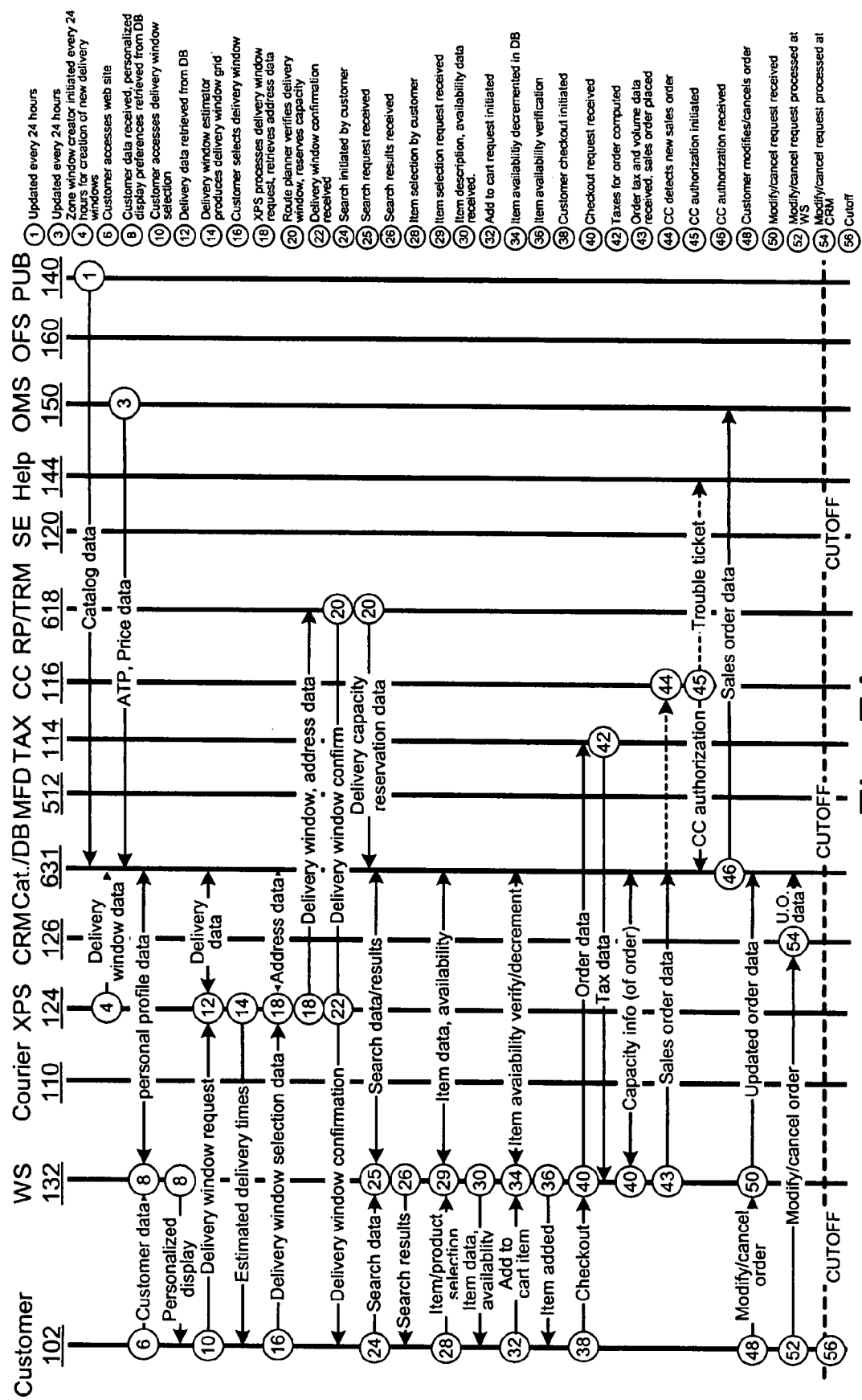
Figure 7B:
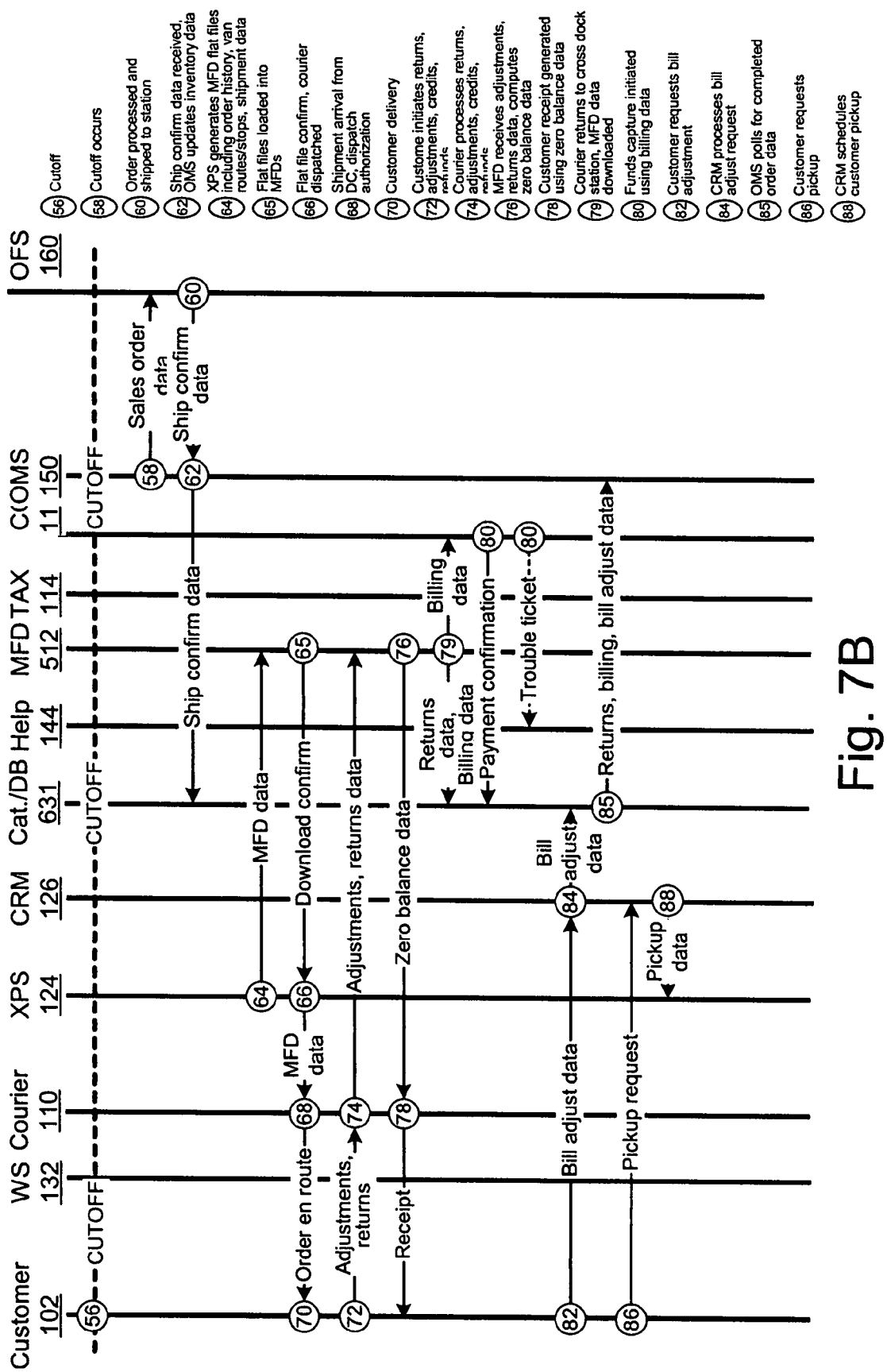
Figure 8:
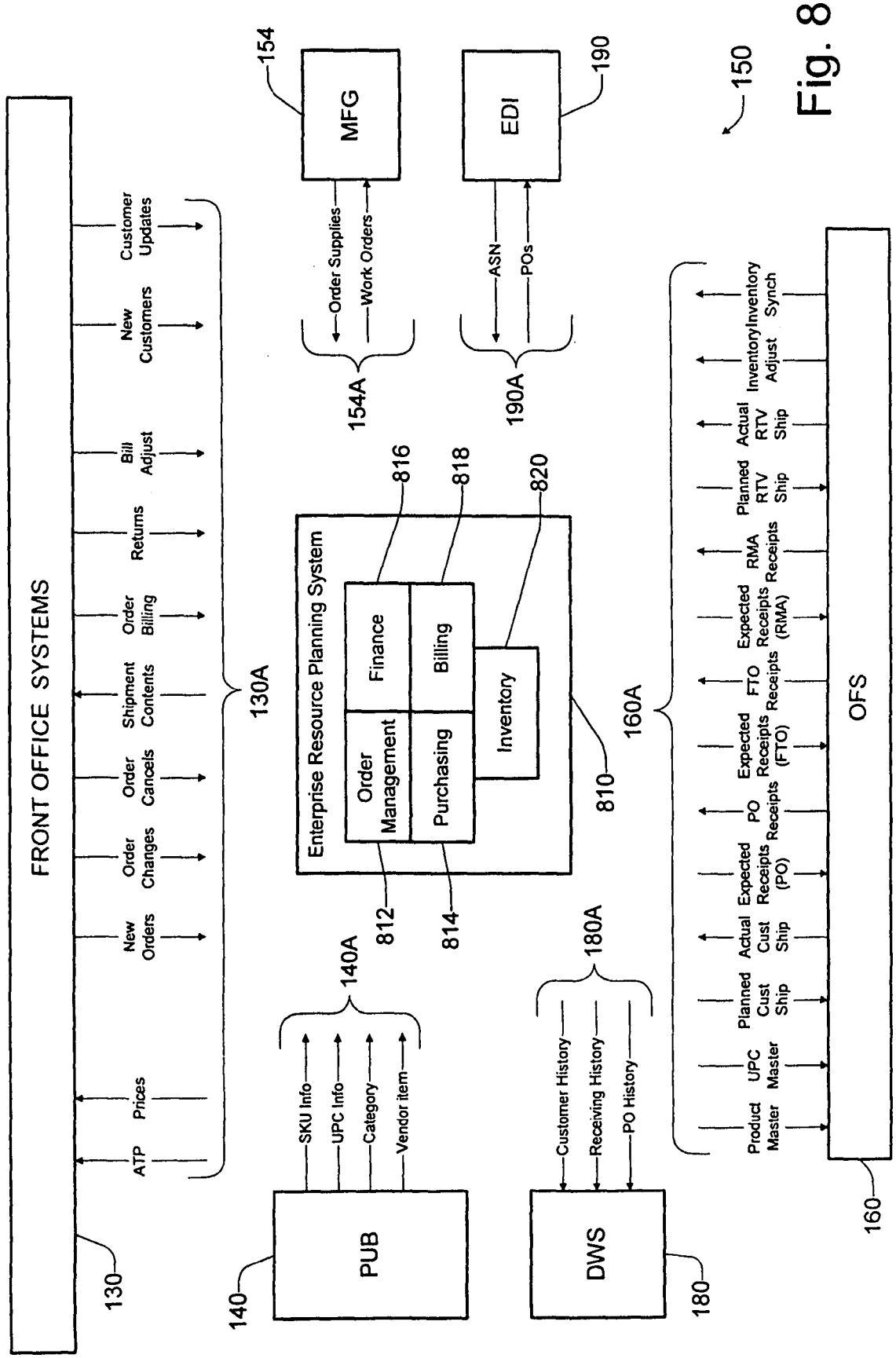
FIG. 8 shows a schematic block diagram illustrating various types of data which flow through the Order Management Subsystem (OMS) in accordance with a specific embodiment of the present invention.

FIG. 8 shows a block diagram of the different functional elements provided by the Order Management Subsystem, as well as the various types of data which flow between the Order Management Subsystem and the other subsystems of the present invention. As shown in FIG. 8, the OMS subsystem includes an Enterprise Resource Planning System 810 for processing data received from at least a portion of the other subsystems. The data processing system 810 includes an order management component 812, a purchasing component 814, a finance component 816, a billing component 818, and an inventory component 820. The order management component 812 is responsible for managing customer orders. The purchasing component 814 is responsible for issuing purchase orders to appropriate vendors. The financial component 816 is responsible for managing accounting and finance information relating to the entire system operation. The billing component 818 is responsible for managing customer billing information, including billed transactions. The inventory component 820 is responsible for maintaining inventory records, determining inventory availability, and replenishment of inventory stock. The various data (e.g. 130A, 140A, 154A, 160A, 180A, 190A) which is received at the OMS and/or transmitted from the OMS to the other subsystems are described in greater detail with respect to FIGS. 6, 7A, and 7B of the drawings.

As shown in FIG. 1, the OMS subsystem 150 includes graphical user interface 152, and at least one database 151 for storing various data received from at least a portion of the other subsystems. According to a specific embodiment, the database 151 is configured to include a plurality of schemas, such as, for example, standard packaged application schemas and/or customized schemas. According to a specific implementation, the OMS database is configured as a single Oracle database running on a Sun Solaris server.

The Order Management Subsystem is also configured to include appropriate software and/or hardware for managing financial and distribution applications. According to a specific embodiment, the financial and distribution software is provided by PeopleSoft Corporation of Pleasanton, Calif. Additionally, the financial and distribution application software may include a plurality of components such as, for example, a user interface used for inquiry and on-line transaction entry, batch processes used for background processing of data, reports, etc.

The OMS batch processing may be controlled using a process scheduler. The process scheduler is able to manage the number of concurrent processes being run and the date/time at which certain processes are to run or be executed. The process scheduler may also enable central visibility of all processes currently running. Batch processing and reporting may be accomplished using a variety of different technologies commonly known to one having ordinary skill in the art.

The Order Management Subsystem may be configured to support both asynchronous and synchronous interfaces with the other subsystems. In a specific embodiment, the OMS is configured to support an asynchronous interface with each of the other subsystems. This configuration provides a number of advantages described in greater detail below. Additionally, each OMS interface is configurable, and may be configured to support the running of batch processes as often as is desirable.

According to a specific implementation, all PUB-OMS and WS-OMS interface programs are configured to operate at the database schema level. New and updated data may be posted to a persistent message queue (e.g. staging tables) within the data source database. From there, the data may be processed into the destination database.

Further, according to a specific implementation, the interface between PUB and OMS may be configured as a single executable program which supports moving data (e.g. SKUs, categories, UPCs, etc.) from PUB to OMS. The interface program requests the staging of new or updated data by calling a stored procedure in the PUB database, and then inserts/updates the data staged in the OMS database using appropriate software which insures data validity.

Implementation of the various interfaces between OMS and the other subsystems may be accomplished using a variety of different techniques commonly known to one having ordinary skill in the art. The following description provides an example of at least some of the various techniques which may be used for interfacing OMS with the other subsystems. However, it will be appreciated that the specific interfaces described below may be implemented using other techniques commonly known to those of ordinary skill in the art.

The interface between the OMS and the Webstore Subsystem may be implemented, for example, using a plurality of executable programs. A first portion of the executable programs may be responsible for moving data from the Webstore to the OMS. This data may include, for example, new/updated customer data, new/updated order data, order cutoff information, order billing information, customer return information, customer credits and fees (e.g. bill adjustment data), etc. A second portion of the executable programs is responsible for moving data from the OMS to the Webstore Subsystem. This data may include, for example, inventory data, availability data, pricing data, and information about shipped customer orders.

The interface between OMS and the Order Fulfillment Subsystem (OFS) 160 may be implemented, for example, as a flat file interface. Different files may be used for each type of transaction within the system. For example, the OFS-OMS interface may support the following transactions: (1) new/updated SKU and UPC data from OMS to OFS; (2) expected receipts (for vendor purchase orders and special customer orders) from OMS to OFS; (3) expected receipt confirmations from OFS to OMS; (4) planned customer shipment data from OMS to OFS; (5) shipment confirmation data from OFS to OMS; (6) and inventory synchronization and adjustment data from OFS to OMS. According to a specific embodiment, a third party software package such as, for example, Mercator (from TSISoft (of Wilton, Conn.) may be used to map data from the OMS database to ASCII files (e.g. flat files) and visa versa. Outbound data (from OMS) may be selected directly from tables in the OMS database and formatted to the appropriate file format for transfer. Inbound data (to OMS) is processed into staging tables within OMS, where it may then be processed into transaction tables supported by the OMS batch processes.

Food Production Management Subsystem (MFG)

The Food Production Management Subsystem (MFG) manages information and purchasing requirements relating to recipes, sub-recipes, ingredients, menus, food safety procedures, equipment usage, etc. According to a specific embodiment, SKU data and costs data may be interfaced from OMS to MFG. MFG then computes the cost and nutritional content of a "manufactured" selling SKU (e.g. a cooked item), and transmits the information back to OMS. MFG may also use food production plan and recipe information to determine ingredient purchasing requirements which will then be transmitted to OMS for procurement.

Order Fulfillment Subsystem (OFS)

The Order Fulfillment Subsystem 160 manages all functionality of the distribution center (DC) 170. In the embodiment of FIG. 1, the OFS includes appropriate hardware and/or software for managing the DC facility 170, including, for example, a warehouse management system (e.g. software application), at least one database 161, at least one interface 162, and an automated material handling (AMH) controller component 163, which manages the conveyor, carousel, and scanner components.

In a specific implementation, the Order Fulfillment Subsystem 160 may be implemented using a warehouse management system such as, for example, the MOVE warehouse management system provided by Optum, Inc. of Costa Mesa, Calif. The warehouse system also provides the interface with the Order Management Subsystem. In a specific embodiment, this interface is implemented using a business host interface (BHI). The warehouse management subsystem may also provide the interface for allowing the OMS subsystem to communicate with the OFS database 161.

The warehouse management system communicates instructions (e.g. task lists) to the automated material handling controller (AMH) 163. The AMH controller processes the instructions and manages the conveyor server 178 and carousel server 172. The carousel server 172 and the conveyor server 178 may each include a respective database 171, 175. The carousel server 172 issues control signals to the carousel client 173, which drives the carousel hardware 174 and controls the carousel movement. Similarly, the conveyor server 178 processes instructions from the AMH, and issues control signals to the conveyor client 177, which drives and controls the conveyors and scanner hardware 176 used for routing inventory and for managing traffic. Additionally, the conveyor client 177 and the carousel client may be configured with an interface for monitoring the status of the conveyor and carousel hardware.

The warehouse management system also communicates with handheld computing devices 164 via a wireless interface such as, for example, a radio frequency (RF) interface. The handheld computing devices 164 are used by the distribution center employees to perform and/or confirm inventory movement operations. A graphical user interface 162 to may be provided for interfacing with the Order Fulfillment Subsystem in order to provide users with the ability to monitor distribution center operations and/or manually allocate orders.

According to one embodiment, the OFS may be defined to include the distribution center 170 and all its related elements, including hardware, human resources, inventory stock, etc. In an alternate embodiment, as shown in FIG. 1, for example, the distribution center 170 may be defined to include the OFS and its components (160, 161, 162, 163); carousel and conveyor components 172, 173, 174, 176, 177, 178; and handheld computing devices 164.

Data Warehouse Subsystem (DWS)

The Data Warehouse Subsystem 180 is the data repository for information from at least a portion of the subsystems which form the integrated system of the present invention. The DWS subsystem is configured to analyze the various subsystem data and generate reports based on the analyzed data. According to a specific embodiment, the Data Warehouse Subsystem maintains a centralized database. According to an alternate embodiment, the Data Warehouse Subsystem may comprise a plurality of databases and other components, including, for example, an Operational Data Store (ODS) 181, a Data Warehouse (DW) 189, a data analysis component, and a report generating component.

The Data Warehouse Subsystem periodically polls or captures data from each of the operational subsystem databases, and stores this information into an Operational Data Store (ODS) 181. By collecting data from the various subsystems into a single ODS, complex reports and/or queries may be performed on the ODS data more efficiently, and without impacting the performance of the operational subsystems.

Each operational subsystem may include a set of interdependent tables, referred to as a Data Source. The tables in a Data Source may reside together in one database, or may reside in different databases, and further may have referential constraints among them. A process referred to as "change capture," incrementally collects updated and newly inserted rows from each Data Source and stores them into staging tables in the ODS. A consistent set of changes for a Data Source may be moved from the staging tables into the ODS at periodic intervals (e.g. every 24 hours).

According to specific embodiments, the ODS includes all or a portion of the data source tables from each of the operational subsystems, except for those that are explicitly excluded by request of a subsystem administrator. It may also include detailed data collected from all Areas and Subsystems. The ODS data may be used, for example, for reporting on daily and/or weekly activities and for investigating details of operations which have previously occurred.

The Data Warehouse (DW) 189 comprises tables which are derived from the ODS. Preferably the DW tables are designed to facilitate reporting and business analysis. According to a specific embodiment, the data in the Data Warehouse is aggregated and de-normalized to produce fewer, wider tables that present a "high level" description of the business.

The Data Warehouse Subsystem 180 also provides for operational and analytical report functionality. Reports of detailed data from the previous day or earlier may query the ODS database. Analytical reports may access both the ODS and DW tables. If reports on the minute-to-minute status of operational subsystems are desired, one or more interfaces may be provided to allow the Data Warehouse Subsystem to query the operational databases of the desired subsystems.

According to a specific embodiment, the Data Warehouse Subsystem database takes advantages of features such as, for example, a "snapshot log" and "serializable transactions." When a snapshot log is created on a given table, the database software creates a side table and a trigger that fires every time the side table is updated, to store the changed, added, or deleted record into the table. The DWS can then examine the side table and pull only rows that have changed as of a particular time. Serializable transactions ensure transaction-level consistency in the records. Data may be periodically pulled into the staging area (e.g., hourly, daily, etc.). Additionally, consistent transactions may be periodically pulled from the staging area into the ODS database (e.g., hourly, daily, etc.).

Figure 10:
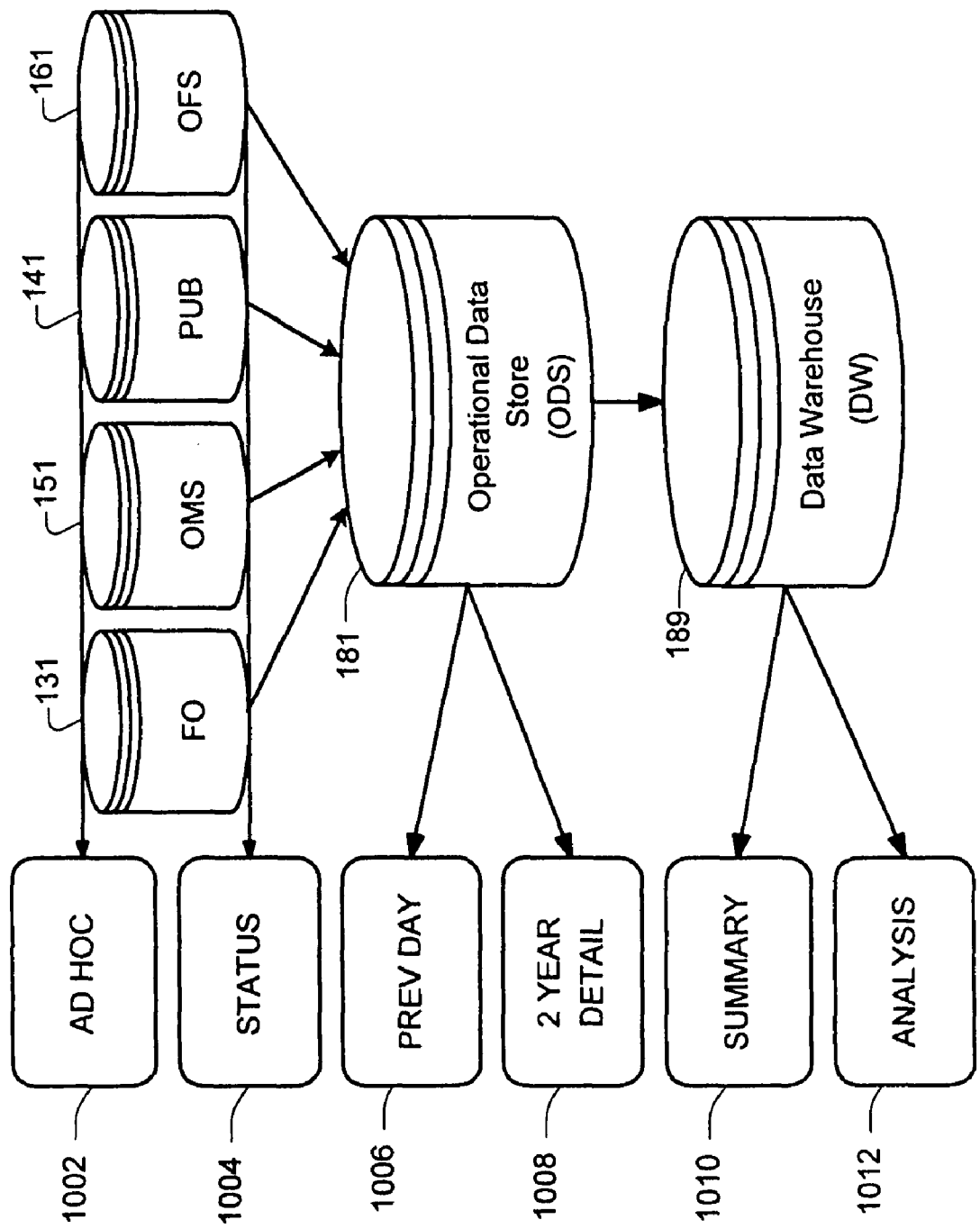
FIG. 10 shows a schematic block diagram of a database reporting and analysis environment in accordance with a specific embodiment of the present invention.

As shown in FIG. 10, the ODS database 181 and the Data Warehouse database 189 may be used to provide a plurality of reports including, for example, ad hoc reports 1002, status reports 1004, daily reports 1006, yearly reports 1008, summary reports 1010, and other types of analytical reports 1012.

Integrated System Architecture Operations

In order to gain a better understanding of the integrated nature of the system architecture of the present invention, it will be helpful to review the interactions between the various subsystems during normal business operations.

Figure 4:
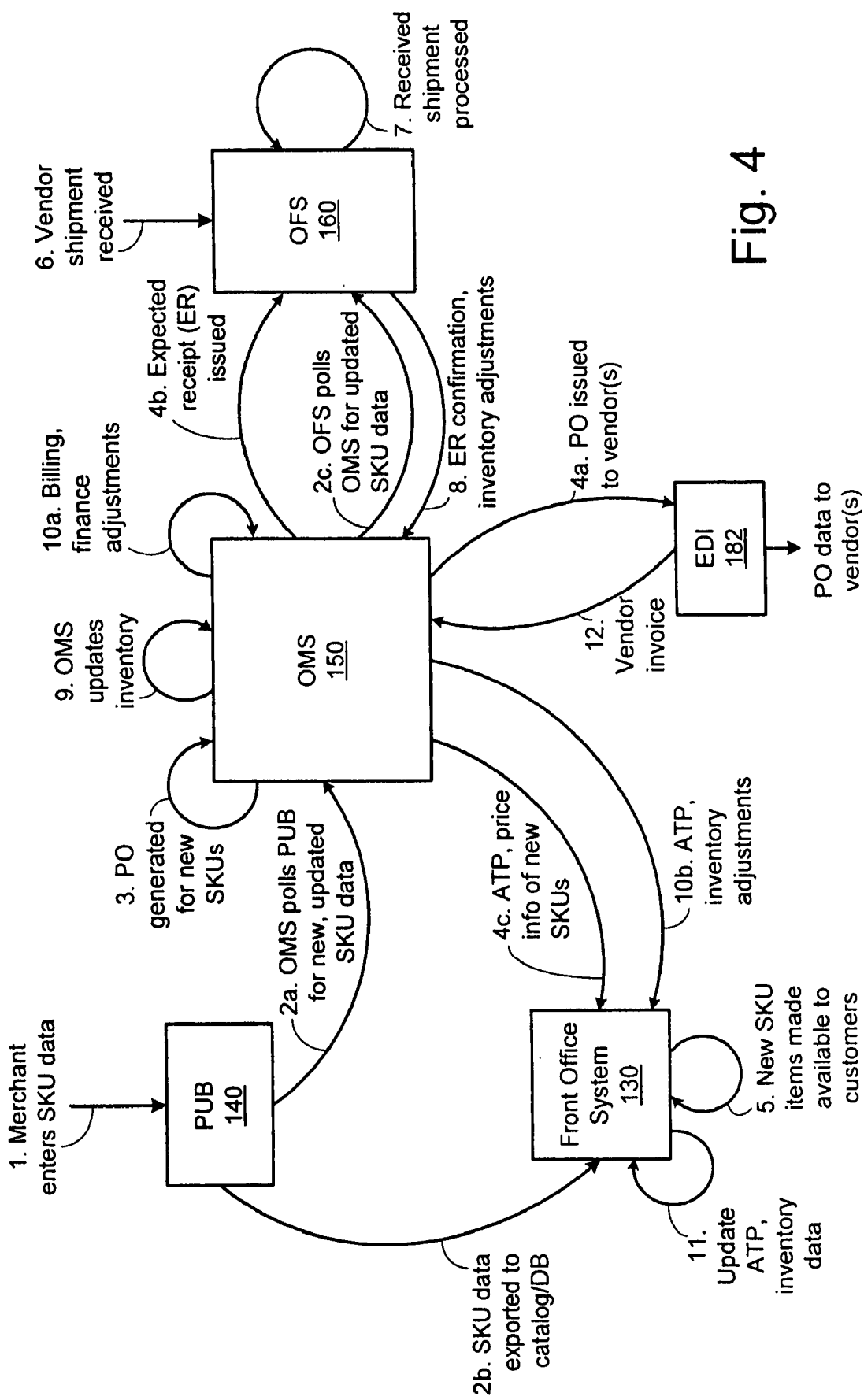
FIG. 4 shows a state diagram in accordance with a specific embodiment of the present invention, illustrating a high-level through of subsystem interactions relating to inventory inflow.
Figure 5:
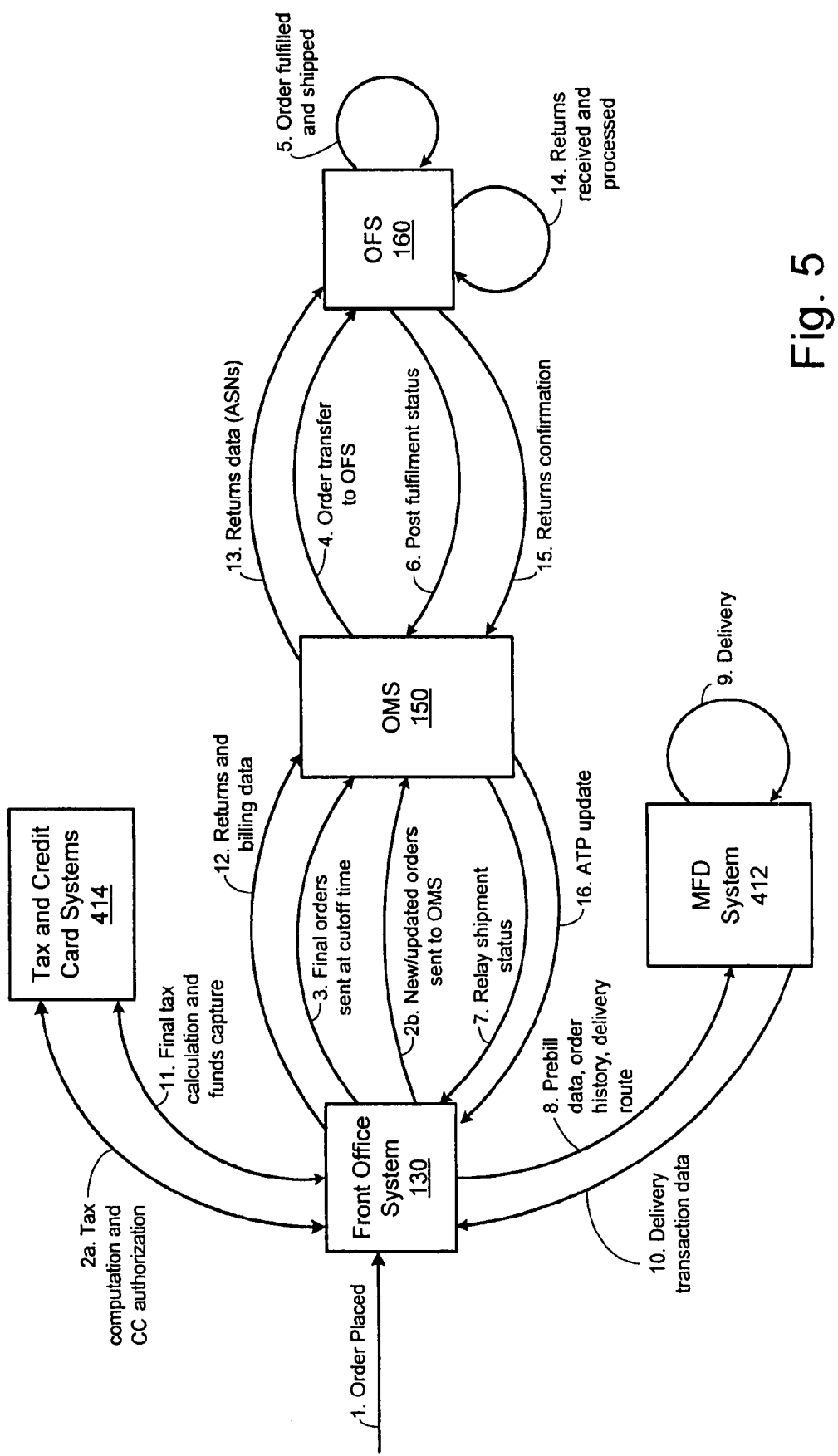
FIG. 5 shows a state diagram in accordance with a specific embodiment of the present invention, illustrating a high-level walkthrough of subsystem interactions relating to inventory outflow.

FIGS. 4 and 5 provide high-level data flow diagrams of the various subsystem interactions during normal business operations. More specifically, FIG. 4 provides a high-level walkthrough of subsystem interactions relating to inventory inflow (e.g. inventory replenishment). FIG. 5 presents a high-level walkthrough of subsystem interactions relating to inventory outflow (e.g. customer order fulfillment and delivery).

Referring to FIG. 4, at (1) new or modified item (SKU) information may be entered by a merchant into the PUB Subsystem 140 via either the PUB Web GUI (134, FIG. 1) or Bulk Loader interface (136, FIG. 1). The SKU information may include descriptive information about the item such as, for example, UPC codes, images, nutritional information, attributes, product name, etc.

At (2*a*) the OMS periodically polls the PUB for new or updated SKU data. The new/updated SKU data is stored within the OMS database 151 (FIG. 1). At (2*b*) the SKU data is also automatically exported to the database and catalog components of the Front Office system 130. According to the embodiment of FIG. 4, however, new items which are imported into the master Webstore catalog are not made available to customers until a purchase order has been issued for the new item. At (2*c*) the OMS periodically sends to the OFS the new/updated SKU data. The new/updated SKU data is stored in the OFS database 161 (FIG. 1).

At (3) it is assumed that a buyer has approved a purchase order (PO) which has been generated for a new item at the Order Management Subsystem 150. Once the PO has been approved, at (4*a*) the PO is automatically sent to the appropriate vendor(s) via the EDI Subsystem 182. Additionally, at (4*b*) an expected receipt (ER) for the purchase order item(s) is automatically issued from OMS 150 to OFS 160. The expected receipt informs OFS that specific item quantities (related to the purchase order) are expected to arrive at the distribution center on or near a particular date.

Additionally, after the purchase order for the new item has been approved, at (4*c*) the OMS 150 automatically informs the Front Office system 130 of the availability and price of the new item. In at least one embodiment, availability includes specific data about how many units of the new item will be available on specific dates. This availability data is referred to as available-to-promise (ATP) data.

Further, in at least one embodiment, price data may be computed or set and approved (e.g., by buyers) in the OMS. According to a specific implementation, pricing may be computed based upon a cost plus pricing method. Accordingly, the price of a particular item (SKU) which is viewed by a customer in a first geographic area may be different than the pricing information displayed to a customer in a second geographic area, depending upon the relative cost involved in storing the particular item in each geographic area. When new prices are approved, OMS publishes them to the Webstore Subsystem, which then updates the pricing information displayed to the customer.

The pricing for a particular item may be based upon the descriptive information which the merchant provides for that item or SKU. Accordingly, pricing may therefore be determined automatically using a pre-determined set of rules which may be different for each geographic area. For example, when a purchase order for an item occurs, the attributes associated with that item (SKU) are assigned a cost factor or a number specific to the geographic area in which the item is to be delivered. Pricing for the ordered item may then be automatically determined based upon this cost factor.

Once the Webstore receives the ATP and price data of a new item, at (5) the new item information is automatically made available for customer viewing and purchasing. The item information displayed to the customer may be obtained from the catalog data previously imported into the Webstore catalog from the PUB Subsystem.

At (6) it is assumed that a vendor shipment relating to the new purchase order item(s) is received at the distribution center. At (7) the received shipment is processed, which includes inventorying and storing each item of the received shipment. Once the received shipment has been processed, at (8) an expected receipt confirmation is issued from OFS 160 to OMS 150. Additionally, OFS provides any inventory adjustments (e.g. shorts) relating to the original purchase order and the received shipment. When the OMS receives the expected receipt confirmation data, at (9) the OMS processes the data and updates its inventory records and ATP information. Once the OMS inventory records have been updated, at (10a) the OMS performs any necessary financial transactions relating to the purchase order, based upon the expected receipt confirmation data. Additionally, at (10b) revised ATP and inventory data relating to the received item(s) are sent from the OMS 150 to the Front Office system 130. At (11), the Front Office system (e.g. Webstore) updates its ATP and inventory records for the appropriate item(s) based upon the revised data received from the OMS.

At (12), the vendor issues an invoice for the purchase order shipment via the EDI subsystem 182. It will be appreciated, however, that this latter event may occur at any time after the purchase order has been received by the vendor.

The example of FIG. 4 illustrates several unique and advantageous features which may be attributable to the integrated nature of the system architecture of the present invention. For example, the asynchronous architecture of the Back Office system enables a merchant to enter descriptive product information into the PUB Subsystem 140 at any time. PUB Subsystem components such as, for example, the Bulk Loader 136, automatically classify, categorize, sort and catalog the received merchant data. Once processed, the received merchant data is stored in the PUB Subsystem. Thus, it will be appreciated that the entire publication and cataloging process of the integrated system may be automatically driven by the merchants. This process provides cost efficiency by eliminating labor costs which would otherwise be required for PUB system operators to manually maintain and update the publication/catalog database.

Another distinct advantage of the integrated architecture of the present invention is that its integrated nature allows for automatic updating of information within the various subsystems based upon a single event occurring in any one of the subsystems. Thus, for example, as illustrated in FIG. 4, a purchase order for a new item (at 3) automatically causes the purchase order to be issued to the appropriate vendors, an expected receipt for the purchase order to be issued to the Order Fulfillment Subsystem 160, and automatically causes updated ATP and price data to be transmitted to the Front Office system, whereupon the updated ATP and price information will automatically be displayed to the customer. Additionally, where the PO relates to a new item of inventory, the new item information will automatically be made available to the customer using the descriptive information previously provided by the merchant. Further, the automatic issuing of an expected receipt results in the automatic tracking of the status, payment, delivery, and actual received inventory relating to the purchase order. Moreover, according to a specific embodiment, when a new product shipment arrives, the inventory system will already be configured to recognize the product's UPC code. Additionally, the product availability (ATP) displayed to the customer will automatically be updated based upon the order status and expected arrival date of the product, as well as the availability of the product once it has arrived at the distribution center. In this way, the technique of the present invention significantly reduces the amount of manual labor needed for managing and maintaining all aspects of inventory inflow.

Referring to FIG. 5, a high-level walkthrough of subsystem interactions relating to inventory outflow (e.g. customer ordering, fulfillment, and delivery) is shown. At (1) an order is placed by a customer via the Webstore of the Front Office system 130. According to a specific embodiment, the customer order is placed after the customer performs a "checkout" procedure whereby items from the customer's electronic shopping cart are processed for sale. After the customer completes the checkout procedure, at (2a) the Webstore performs tax computation and credit card authorization for the total value of the order. According to at least one embodiment, the customer is not billed for the order at this time. Rather, using the customer's credit card or debit card information, an authorization is obtained which verifies the available credit limit and validity of the customer's credit or debit account. According to a specific embodiment, tax computation and credit card authorization may be performed by the tax and credit card systems 414 (FIG. 5) which, in the embodiment of FIG. 1, are components of the Webstore Subsystem 132. Further, according to a specific embodiment, each scheduled order will have an associated credit (or debit) card authorization.

After the customer order has been placed, but before a predetermined cutoff time has passed, the customer may cancel or modify any part of the order, including modifying the delivery time window associated with the order. Customer service representatives (CSRs) are also permitted to make changes to scheduled orders until cutoff time. Additionally, during this time, at (2b) the OMS periodically polls the Webstore for new or updated scheduled orders so that the OMS may process any necessary demand planning. According to a specific implementation, the cutoff time for a particular customer order is determined based on the delivery window of the scheduled order.

In a specific embodiment, order modifications may be implemented by making a new Webstore order, which is an action that may create new scheduled orders or change existing scheduled orders. A customer or CSR may make changes such as, for example, deletion of ordered items, modifying the quantity of one or more ordered items, modifying delivery times or delivery destinations, or canceling entire shipments. If changes require any credit card re-authorization, the Front Office software will handle it.

At cutoff time, the Transportation Subsystem of the Front Office adds finalized route information to the customer order. After the cutoff time, at (3) the OMS polls the Webstore to obtain the final information relating to the scheduled order(s). Additionally, the Webstore updates its ATP data relating to items associated with the scheduled order(s). According to an alternate embodiment, the Webstore may update its ATP data each time it modifies the contents of a customer's electronic shopping cart. Once the Webstore provides the updated ATP data to the OMS, the OMS updates its ATP data so that it is in synchronization with the Webstore ATP data. According to a specific embodiment, the only time that the OMS and WS ATP data are out of synchronization is when new deliveries are received at the distribution center, and the new ATP data has not yet been propagated to the Webstore. The OMS calculates its ATP data based upon customer orders at the Webstore and upon shipments received at the distribution center.

According to a specific embodiment, before the cutoff time has occurred, the OMS may place the customer order on hold to prevent it from being passed to the OFS for fulfillment. After cutoff, when the order is "final" or "frozen," the OMS will remove the hold on the order so that the order will be passed to the OFS 160 for fulfillment, as shown at (4). An order may be considered final or frozen when all of its information (e.g. order information and delivery information) is final. The order data which is transferred to the OFS subsystem 160 may include both SKU data and transportation/delivery data (e.g. delivery vehicle routes, stops, etc.).

At (5) orders received at the OFS subsystem are fulfilled and processed for shipment to the customers. The ordered items are transported in containers or totes. Each tote has a unique physical license plate ID which includes bar codes that may be read by a scanner. Each tote is associated with a respective customer order. Each customer order may comprise one or more totes.

After the order has been fulfilled and processed for shipment, at (6) the OFS transmits post fulfillment status data relating to the customer order to the OMS. The post fulfillment status data may include, for example, the number of totes and the physical license plate ID of each tote associated with the customer order, the ID of each shipping dolly used to transport the totes to and from the delivery trucks, and/or the vehicle ID associated with the shipped order. At (7) the OMS relays the shipment status information to the Webstore of the Front Office system 130. The shipment status data may include adjustments for ordered items which were not fulfilled. Upon receiving the shipment status data, the Webstore updates the order status of the shipped order, which may be accessed by the customer and CSRs.

Once the shipment status information is received at the Front Office system 130, at (8) the Front Office system downloads delivery list data, customer order history data, and delivery route data to the mobile field device (MFD) system 412. According to a specific embodiment, the Transportation Subsystem of the Front Office transmits the delivery list, customer order history, and delivery route data to an MFD server, which then downloads the data into a mobile field device (i.e. MFD or MFD client).

After the proper data has been downloaded into the MFD, the delivery courier may be dispatched to deliver the order to the customer. At (9) the order is delivered to the customer by the delivery courier. At this time, the delivery courier may use the mobile field device to process tote returns, item returns, order modifications, order adjustments, credits, tax calculations, etc. According to a specific embodiment, the mobile field device (MFD) is configured to process the above-described customer service transactions without communication to the MFD server. After the various customer service requests have been processed by the MFD, the courier may present the customer with a modified billing receipt which includes an adjusted total amount that takes into account any processed returns, order modifications, adjustments, credits, and/or new tax calculations.

Additionally, at the time delivery is made to the customer, the delivery courier may scan each delivered item using the MFD in order to generate a record of items actually received by the customer. This information is stored in the MFD along with a delivery time stamp.

When the delivery courier returns to the area station, the processed data stored in the MFD is uploaded to the MFD server. According to a specific embodiment, the MFD data may also be remotely uploaded into the MFD server via a wireless communication system, while the delivery courier is in the field. At (10) the delivery transaction data is transferred from the MFD system 412 to the Front Office system 130. According to a specific embodiment, the MFD server transfers the delivery transaction data to the Transportation Subsystem, which then updates the order status information in the Front Office database. At (11) the Front Office system performs final tax calculations based upon the updated order status information, and initiates a funds capture using the customer's billing information. It is at this point that the customer is actually billed for the order. Moreover, the billed amount will take into account any returns, order modification, adjustments, and/or credits which were processed by the MFD at the time of delivery.

At (12) the Webstore transmits the final invoice data and returns data to the OMS. The OMS processes the final invoice data and returns data, and updates the customer invoice and billing records accordingly. Additionally, at (13) the OMS notifies the OFS of any returns (by way of advance shipment notices—ASNs) so that the OFS may properly process the returned items once received. At (14) the returned items are received and processed by the OFS. After the returned items have been processed and restocked in the distribution center, at (15) the OFS transmits returns confirmation data to the OMS. The OMS then updates its inventory and ATP data based upon the returns confirmation data received from OFS. Additionally, at (16) the OMS forwards the updated ATP data to the Front Office system 130, whereupon the Webstore updates its ATP information.

As mentioned previously, the integrated nature of the system architecture of the present invention provides a number of unique and novel advantages which are not realized by conventional systems such as those described in the background of this application. For example, one advantage of the technique of the present invention relates to the ability of a customer to modify an order after it has been placed. As described in FIG. 5, orders may be modified by the customer at any time before the designated cutoff time for that order. Additionally, the customer may also modify the order at the time of delivery. Moreover, the system of the present invention provides the ability for customer returns, credits, and/or adjustments to also be processed at the time of delivery. These latter features are made possible, in part, due to the integration of the delivery courier and mobile field device with the other subsystems of the present invention.

Another advantage of the technique of the present invention relates to the timing of customer billing. As stated previously, conventional on-line stores typically bill a customer for an order at the time of shipment. However, according to the technique of the present invention, the customer is billed after delivery of the order to the customer. Moreover, the integrated nature of the system architecture of the present invention enables the total billing amount to be adjusted to reflect any returns, order modifications, credits, and/or adjustments which were processed at the time of delivery or at the time of a scheduled pickup. Further, by providing a modified or "zero balance" receipt to the customer at the time of delivery, the customer receives immediate confirmation of all currently pending charges for which the customer will be billed. This provides the customer assurances that no additional or hidden charges will appear on the customer's credit or debit account.

Further, the integrated architecture of the system of the present invention may also provide for real-time failover capabilities. More specifically, the asynchronous design of the system architecture allows the system to continue operating despite one or more subsystems going down. For example, a temporary subsystem failure at the OMS will not affect the customer shopping and order functions performed by the Front Office system 130. Additionally, backed up data may be queued and batched for processing when the down system comes back on line.

Capacity and ATP Data Calculations

Another advantage of the integrated system architecture of the present invention relates to available-to-promise (ATP) information about catalog items presented to the customer, and the reservation and allocation of resource capacity within the various subsystems. According to at least one embodiment of the present invention, the inflow of orders is managed at the time of ordering based upon available capacity of selected subsystems. The ATP information associated with a particular item may be used to regulate the order inflow for that item.

According to a specific embodiment, the Webstore Subsystem keeps track of the number of available items, and allows customers to select only items that are guaranteed to be available in a given time slot. The display may be based upon expected (e.g., scheduled) arrival of SKUs into the distribution center. If a shipment does not arrive or is delayed, this information is propagated to the WS, whereupon the WS automatically updates the availability information relating to the items of the delayed shipment. The WS may keep track of the time slots in which an item is available, using, for example, "available", "in stock", "available until", and "available on" labels in the store display.

According to an alternate embodiment, ATP values (e.g., quantities of specific items which are available to promise) are computed in OMS and published to the Webstore. The ATP data may be computed, for example, based on a SKU inventory management method, an ATP method, physical inventory quantity, and/or quantities scheduled to be received from vendors.

Further, according to a specific implementation, each item or SKU has an associated capacity profile relating to an amount of capacity to be reserved in various subsystems to guarantee fulfillment and delivery of the item on the specified delivery date and time. The capacity profile of a particular item may include a plurality of individual capacity attributes such as, for example, an inventory type attribute, a pick type attribute, a time attribute, a space attribute, etc. The inventory type attribute relates to whether an item exists as an "on the shelf" item (referred to as "dwelled" inventory, such as, for example, a bag of Brand X potato chips) or whether the item must be filled to order (FTO) such as, for example, a particular cut of meat. The pick type attribute relates to the storage conditions associated with the item such as, for example, room temperature storage (ambient), chilled, or frozen. The time attribute relates to estimated amounts of human resource time it will take to fulfill and deliver the order. The time attribute may include a plurality of sub-categories, including, for example, a picker time value, and a courier time value. The space attribute relates to the physical space requirements associated with the item.

According to a specific embodiment of the present invention, the Webstore 132 maintains a resource capacity data cache of currently available and reserved capacity resources corresponding to selected subsystems. When a customer selects a particular item for purchase, the Webstore retrieves the capacity profile for the selected item, and uses this data to determine whether there is sufficient resource capacity in the selected subsystems to ensure that the selected item may be fulfilled and delivered to the customer by the specified delivery date, location, and time. If there are insufficient capacity resources in any of the selected subsystems, the Webstore will not show the item as available for sale or delivery for the specified delivery time window.

If, however, the Webstore determines that there are sufficient capacity resources in each of the selected subsystems to ensure that the selected item may be fulfilled and delivered to the customer by the specified delivery time window, the Webstore Subsystem will permit the selected item to be added to the customer's electronic shopping cart. Additionally, as the Webstore Subsystem adds the item to the customer's electronic shopping cart, it also reserves a specific amount of resource capacity in each of the selected subsystems by updating the data contained in the resource capacity data cache. According to this specific embodiment, the amount of capacity reserved by the Webstore in each of the selected subsystems is related to the capacity profile attributes of the selected item. In this way, the Webstore Subsystem may continually keep track of available resource capacity in each of the selected subsystems in order to compute ATP data relating to Webstore catalog items, and further, may use this data to regulate the inflow of customer orders at the time of ordering.

The following example provides an illustration of this concept. In this example, it is assumed that a customer wishes to add a container of ice cream to the customer's electronic shopping cart. When the customer selects the container ice cream to be added to his or her shopping cart, the Webstore Subsystem may first determine, for example, the selected item availability (e.g. available quantity for the specified delivery date), the storage temperature of the item, whether there are sufficient human resources to fulfill the item order by the specified delivery time, and whether there are sufficient transportation resources available to deliver the item by the specified delivery time, including whether there is sufficient space in the freezer section of the delivery vehicle to accommodate the ordered item on the specified delivery date. Assuming that each of these resources is available, the Webstore adds the selected item to the customer's shopping cart. Additionally, upon adding the item to the shopping cart, the Webstore Subsystem reserves a sufficient amount of capacity in selected subsystems to ensure that the ordered item can be successfully fulfilled and delivered to the customer by the specified delivery date and time.

If a customer subsequently modifies an order (before the cutoff time) or deletes an item from the customer's shopping cart (before checkout), the Webstore Subsystem automatically frees any reserved capacity for the deleted or cancelled items so that this capacity may be reserved by other customers. Capacity may also be freed if the customer abandons his or her shopping session and/or fails to proceed to customer check-out.

According to one embodiment of the present invention, the Webstore Subsystem is responsible for computing current ATP data and for maintaining reserved and available resource capacity records corresponding to selected subsystems. However, according to a different embodiment, the OMS may perform these functions.

Data Flows

Figure 6:
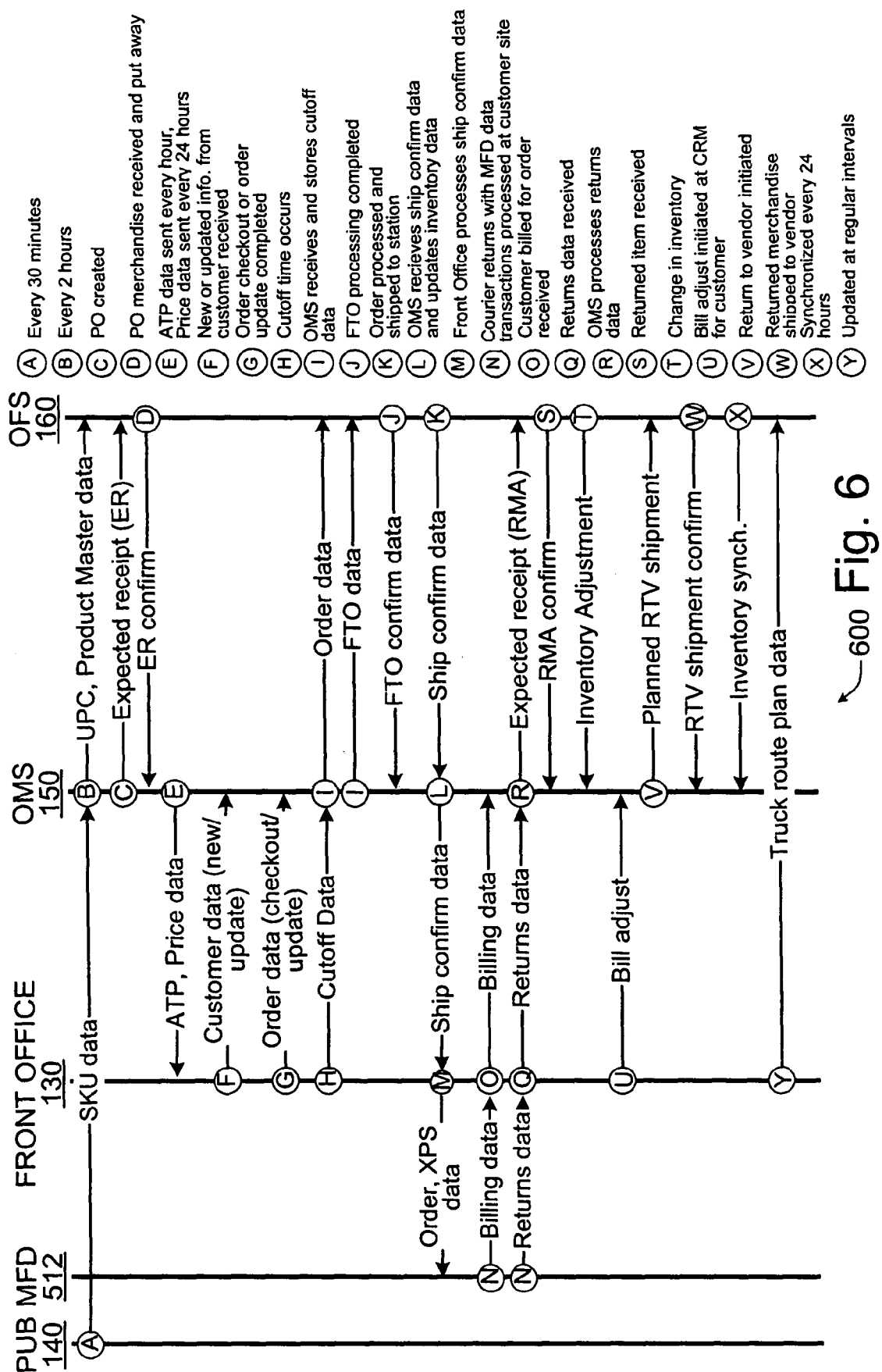
FIGS. 6, 7A, and 7B show flow diagrams illustrating how various systems, subsystems, and components of the present invention interact during normal business operations in accordance with a specific embodiment of the present invention for effecting electronic commerce via a data network.

FIGS. 6, 7A and 7B, illustrate specific embodiments of data flow diagrams of various subsystem and component interactions of the present invention during normal business operations.

It will be appreciated that the various data flows illustrated in FIGS. 6, 7A, and 7B are not necessarily presented according to a specific chronological order. As explained in greater detail below, data flow from one subsystem to a second subsystem may be triggered in response to an occurrence of an event. Other types of data flows in FIGS. 6, 7A and 7B may be initiated at pre-determined time intervals.

Referring to FIG. 6, at (A) the OMS 150 polls the PUB Subsystem 140 for new or updated item data at periodic intervals, which may range from minutes to days. According to a specific embodiment, the OMS may poll the PUB Subsystem for new/updated item data about every thirty minutes. The item data may include, for example, new or updated SKU data, UPC data, vendor data, etc.

At (B) the OMS processes the received item data, and transmits to the OFS SKU information (e.g. UPC and product master data) at periodic intervals such as, for example, every two hours. According to a specific embodiment, the product master data includes a list of all assigned SKUs in the integrated system, as well as UPC and descriptive data associated with each SKU.

At (C) a PO is created or generated at the OMS. In response, an expected receipt for the PO is transmitted from the OMS to the OFS. At (D) the PO merchandise is received, inventoried, and put away. Once the received inventory has been processed by the OFS, the OFS send an expected receipt confirmation to the OMS. The OMS uses the expected receipt confirmation data to update its inventory and ATP data. At (E) ATP and price data is sent from OMS to the Front Office 130 at periodic intervals. For example, ATP data may be sent every hour, and price data may be sent every 24 hours. Further, according to a specific embodiment, all data sent from the OMS to the Front Office is stored in the Front Office database 131 (FIG. 1), which may be referred to as the Webstore database.

At (F) new or updated customer information is received from the customer at the Webstore Subsystem. In response, this data is forwarded from the Webstore to the OMS. At (G) an order checkout or order update action is completed at the Front Office. According to a specific embodiment, when a customer places an order on the on-line store, the Webstore Subsystem creates a sales order and a scheduled shipment for the customer order. The sales order may include one or more order lines representing the items, quantities, and prices of ordered items that have been promised to be delivered to a customer's location at a scheduled delivery window. Further, according to at least one embodiment, the scheduled delivery window is captured in the scheduled shipment. Additionally, for each scheduled shipment, the Transportation Subsystem schedules a vehicle stop on a particular delivery route.

According to a specific embodiment, the OMS periodically polls the Webstore database for new orders, order updates, and order cancellations. The received data is then processed in the OMS.

At (H) cutoff time occurs. According to a specific embodiment, the cutoff time for a particular customer order is based upon the delivery window time associated with that customer order. There may be several cutoff times during any given time period (e.g. several different cutoff times each day), wherein each different cutoff time corresponds to a specific portion of customer orders associated with specific delivery window times. For example, customer orders to be delivered between 9:00 am and 1:00 pm on a particular day may have a cutoff time of 12:01 am that same day, while customer orders to be delivered between 1:01 pm and 6:00 pm on a particular day may have a cutoff time of 4:01 am that same day.

At order cutoff, the Front Office performs cutoff processing on orders that are ready for cutoff, which is based upon a time value needed for the order to be fulfilled and shipped out of the distribution center in order to be delivered on time to the customer's delivery address. In one embodiment, the Transportation Subsystem cutoff processing optimizes all delivery vehicle routes that are ready for cutoff. Webstore cutoff processing may perform substitutions on order lines for SKUs that are oversold. According to a specific embodiment, orders that have completed WS and XPS cutoff processing are detected by the OMS. In response, the OMS may poll the Webstore database for additional information relating to the cutoff orders (including fill-to-order or FTO data). The OMS then performs its cutoff processing on the cutoff order and FTO data, and generates (I) order and FTO download files which may then be transmitted to the OFS subsystem for fulfillment and shipment.

The OFS processes the order download files transmitted from OMS, and stores the cutoff order information in the OFS database (161, FIG. 1). The OFS includes an order allocation component which allocates inventory to the cutoff orders, cartonizes the order lines (e.g., assigns one or more totes to each order line), and creates picking tasks. The automated material handling component of the OFS subsystem reads the picking tasks, and transmits data to the carousel and conveyor servers (172, 178, FIG. 1) to operate the carousels and conveyors, and to instruct the distribution center personnel on which items to pick and the respective quantity.

After FTO processing has been completed for a particular order, at (J) FTO confirmation data is sent from OFS to OMS. Moreover, after a specified number of orders has been fulfilled and processed for shipment to the customers or station(s), at (K) OFS performs a shipment confirmation (ship confirm), which creates a ship confirm upload file to be sent to the OMS. As stated previously, the ship confirm data may include, for example, inventory data of items (SKUs) which have been picked and shipped in each order shipment, tote ID data, transportation/delivery data, etc.

Once the OMS has received and processed the ship confirm data and updated its inventory data records, at (L) the ship confirm data is forwarded to the Front Office system for processing. According to a specific embodiment, when all orders for a particular delivery vehicle route are ship confirmed, the Transportation Subsystem generates the MFD data for the delivery route, which includes information about shipments and stops for the route. In addition, the Transportation Subsystem may also generate van route summaries, delivery lists, driving directions for the route, etc. At (M) the Front Office system transmits customer order history data and transportation/delivery data to the MFD subsystem 512. According to a specific embodiment, the MFD subsystem includes an MFD server and at least one MFD client (e.g. MFD handheld device). As described previously, the MFD server loads the customer order history data and route/delivery data for a particular delivery route into the MFD associated with the delivery courier assigned to that route. Thereafter, the delivery courier may be dispatched to deliver the order to the customer.

At the time of delivery, the courier may use the MFD client to process customer returns, order modifications, credits, and/or adjustments. The MFD then re-computes the customer billing data to take into account any returns, credits, or other adjustments. At (N) the delivery courier returns to the station, and uploads the revised customer billing data and returns data from the MFD client into the MFD server. The MFD server then forwards the billing data and returns data to the Front Office 130. At (O) the customer is billed using the revised billing data received from the MFD server. After a customer has been billed for a particular order, the order is closed. According to a specific embodiment, the OMS periodically polls the Webstore Subsystem for closed orders and posts the received data to the OMS finance component. Additionally, at (Q) the returns data is received at the Front Office system, where it is processed and forwarded to the OMS.

It will be appreciated that, in at least one embodiment, returns, fees, and/or credits for customer accounts may be generated and captured in the Webstore Subsystem both during and after delivery. Examples of fees may include a delivery fee, a returned tote deposit, a cancellation fee, etc. Examples of credits include a late delivery credit, a tote deposit credit, etc. According to a specific embodiment OMS periodically polls the Webstore database for RMAs, fees and credits in order to accurately update its inventory and finance data.

Additionally, according to a specific embodiment, the Webstore may automatically update its ATP data and inventory data based upon the received returns data in order to allow the returned items to be immediately available for customer purchase. However, according to an alternate embodiment, the Webstore will not make it available for purchase until it receives a confirmation that the returned items have been received at the distribution center.

At (R) the OMS receives and processes the returns data and issues an expected returns receipt (RMA) to the OFS. Return merchandise authorizations (RMAs) may be created, for example, in response to item returns, item shortages, damage to items, etc. At (S) the returned item(s) are received at the distribution center (DC). After the returned items have been inspected and processed at the DC (e.g. checked in and put away), an RMA confirmation is sent from the OFS to the OMS. The RMA confirmation may include, for example, SKU data relating to actual items of returned inventory which were restocked in the distribution center.

Periodically, the OFS may detect a change in inventory, such as, for example, due to expired goods, damaged goods, etc. At (T) the OFS periodically sends inventory adjustment data to the OMS for processing. This inventory adjustment data will eventually propagate to the Webstore Subsystem for processing.

At (U) a bill adjustment action is initiated by a CRM at the request of a customer. The bill adjust data is then sent from the CRM subsystem to the OMS for processing.

At (V) a return-to-vendor (RTV) action is initiated at the OMS. In response, the planned RTV shipment data is sent from OMS to OFS for processing. After the specified merchandise has been shipped to the vendor, at (W), the OFS sends an RTV shipment confirmation to OMS. The OMS may then update its inventory records based upon the RTV shipment confirmation data.

As shown at (X) OFS periodically transmits inventory synchronization data to OMS to order to assert that the inventory data in each of the subsystems is synchronized. For example, the OFS may send inventory synchronization data to OMS every 24 hours.

As shown at (Y) truck route plan data is periodically sent from the Front Office to the OFS. This may be performed, for example, on a daily basis, a weekly basis, etc. According to a specific embodiment, the truck route plan data is manually transmitted from the Front Office to the OFS. According to an alternate embodiment, the truck route plan data may be automatically transmitted from the Transportation Subsystem to OFS.

FIGS. 7A and 7B illustrate a detailed data flow diagram of various subsystem and component interactions during normal business operations for effecting electronic commerce in accordance with a specific embodiment of the present invention.

Referring to FIG. 7A, at (1) catalog data is downloaded from the PUB Subsystem 140 to the Webstore database/Catalog cache 631 at periodic intervals, which may range, for example, from hours to weeks. According to a specific implementation, the catalog data is sent from PUB to the Webstore every 24 hours. Further, according to a specific embodiment, the catalog data which is received from the Publication Subsystem is stored in the Webstore database. In order to minimize the delay in accessing the catalog data, a separate instance of the catalog is cached in the working memory of the Webstore Subsystem using the catalog data stored on the Webstore database. There may also be additional instances of other store catalogs cached in the Webstore memory.

At (3) ATP data and price data is sent from the OMS to the Webstore database, which may range, for example, from hours to weeks. According to a specific implementation, ATP data is sent from the OMS to the Webstore every hour, and price data is sent from the OMS to the Webstore every 24 hours.

At (4) the zone window creator component of the Transportation Subsystem creates new delivery windows at periodic intervals. For example, according to a specific embodiment, the zone window creator is initiated every 24 hours to create a new delivery window for one or more days in the future.

At (6) a customer accesses the Webstore 132 via the Internet. The customer may transmit customer data (e.g., registration data) to the Webstore, which is received at (8). Alternatively, customer data may be retrieved by the Webstore from the client computer which may be stored, for example, in a cookie file. According to a specific embodiment, customers may register themselves and maintain their own account information at the Webstore Subsystem. When the customer data is received at the Webstore Subsystem, the WS may retrieve personalized customer preferences from the database in order to present customized and preferred data to the customer. Periodically, OMS polls the Webstore database for new and/or updated customer information.

At (10) the customer accesses the delivery window scheduling portion of the Webstore, which is managed by the Transportation Subsystem. The customer does not necessarily have to reserve a delivery window time slot before shopping on the Webstore. However, according to one embodiment, the customer must schedule a delivery window time slot before being allowed to proceed to checkout.

Further, according to a specific embodiment, when a customer first registers at the Webstore, the customer is asked to provide a delivery address. The address is then converted to a latitude/longitude pair by a Geocoder component of XPS Subsystem, which may consults per-area street map for performing this conversion. The latitude/longitude pair is then determined to be either in-area or out-of-area by a Zone Resolver component of XPS. If the address is in-area, the Zone Resolver also determines the specific zone and subzone associated with the delivery address. This zone and subzone information may then be stored as part of the customer's record, and may be used to determine the specific delivery route to be used for delivering orders to the customer. The initial address is the default address used for all subsequent orders placed by the customer. However, the customer may change the delivery address on a per-delivery basis for any delivery, and may also change the default address for all deliveries at any time.

When a delivery window request is received (12) at the Transportation Subsystem (XPS), it accesses the Webstore database to retrieve delivery scheduling data and the Delivery Window Estimator component of the Transportation Subsystem generates an estimated list of available and unavailable delivery window slots, which is displayed to the customer at (14). At (16) the customer selects an available delivery window time slot. The delivery window selection data is sent to the XPS. The XPS processes (18) the delivery window selection data, and retrieves the customer address data from the Webstore database. The delivery window data and customer address data is then forwarded to the Route Planner component (618) of the Transportation Subsystem. The Route Planner processes the delivery window and address data, and either confirms or denies the delivery window request. According to a specific embodiment, the Route Planner utilizes transportation scheduling and optimization software (SOS) to determine whether a particular delivery window request is to be confirmed or denied.

The Route Planner may consider a plurality of factors when validating a particular delivery window request. For example, there must be sufficient available resource capacity in the Transportation Subsystem before a particular delivery window request may be confirmed. Additionally, the customer address or shipping address must be mapped with a predetermined deliverable area.

Figure 12:
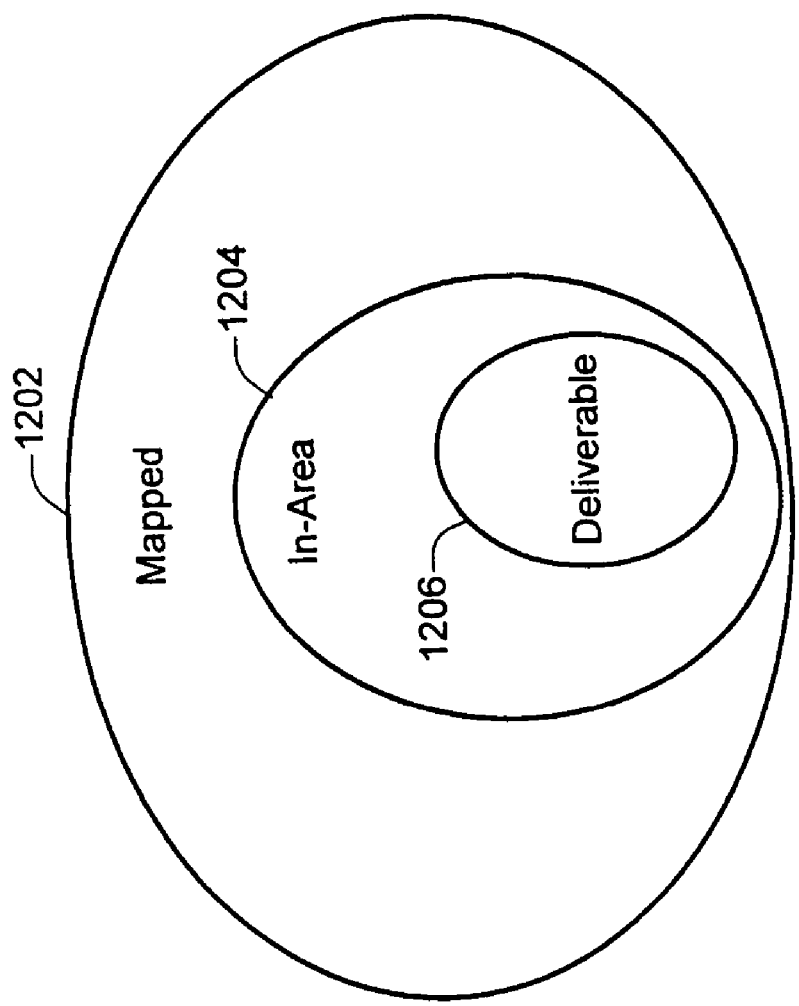
FIG. 12 shows a block diagram illustrating the relationship between shipping addresses which fall within mapped area regions, in-area area regions, and deliverable area regions, in accordance with a specific embodiment of the present invention.

For example, according to the specific embodiment of the present invention, order deliveries may only be scheduled for addresses which fall within pre-determined "deliverable" zones. FIG. 12 illustrates the relationship between customer addresses which fall within "mapped" area regions 1202, "in-area" area regions 1204, and "deliverable" area regions 1206 in accordance with the specific embodiment of the present invention. Generally, a customer address is the representation of a physical place to which goods may be delivered. A mapped address is an address which has a corresponding record in the Transportation Subsystem database. An in-area address is an address which is within the geographic area serviced by one of the system's distribution centers. A deliverable address corresponds to an address where shipments are allowed to be delivered by the delivery couriers associated with the Transportation Subsystem. An additional address type corresponds to a common carrier deliverable address, which is an address to which orders may be shipped by common carrier such as, for example, UPS, or the U.S. Postal Service. An address may be both deliverable and common carrier deliverable.

According to a specific embodiment, a deliverable address is one which is also in-area. However, there are in-area addresses which are not part of the deliverable address subset. For example, a particular geographic region may be classified as in-area, but not deliverable.

Assuming that the customer address corresponds to a deliverable address, and that the delivery window request is available, a delivery window confirmation is issued (20) from the Route Planner to the Transportation Subsystem, where it is then forwarded (22) to the customer. Additionally, upon confirming the delivery window request, the Route Planner forwards to the Webstore database transportation capacity data which is to be reserved for the confirmed delivery window request.

At some point when the customer is interacting with the Webstore, the customer may chose to initiate a search for specific items or products. At (24), the customer submits search data to the Webstore Subsystem. Upon receiving the search data, the Webstore Subsystem accesses (25) the Webstore database, in order to retrieve the search results. Once retrieved, at (26) the search results are then displayed to the customer.

At (28) the customer submits a request for viewing information related to specific items and/or products. When the request is received (29) at the Webstore Subsystem, the WS access the Webstore database in order to retrieve information about the selected items/products, including price and availability. The retrieved information is then displayed to the customer at (30).

At (32) the customer selects a particular item to be added to the customer's electronic shopping cart, or for immediate purchase. When the item selection data is received (34) at the Webstore Subsystem, the Webstore processes the selected item request. During this processing, the Webstore Subsystem accesses the subsystem resource capacity information stored in the Webstore database (or in a working memory cache) to verify that there is sufficient capacity in selected subsystems to ensure that the selected item can be fulfilled and delivered to the customer at the specified delivery window. Once the Webstore Subsystem verifies that the selected item may be added to the customer's shopping cart, the WS updates the capacity information in the Webstore database (or capacity data cache) by reserving a sufficient amount of capacity in each of the selected subsystems to ensure that the selected item may be fulfilled and delivered to the customer at the specified delivery time window. After the Webstore has added the selected item to the customer's electronic shopping cart, the Webstore reports and/or displays (36) this information to the customer.

After the customer has finished shopping at the Webstore, he/she may initiate a checkout procedure in order to purchase the selected items in a customer's electronic shopping cart. When the customer checkout request is received at the Webstore Subsystem, the WS forwards (40) the order information to the tax server 114 (FIG. 1) to compute the appropriate taxes for the order. The tax server 114 computes the appropriate taxes based upon the order information and transmits (42) the computed tax data back to the Webstore. Additionally, at checkout, the WS also retrieves capacity information relating to the order (e.g., volume information relating to the number of totes which will be needed for fulfilling the order). Once the tax data and capacity information have been received, the WS processes (43) the sales order. The sales order data is then stored on the Webstore database.

At (44) the funds capturing component (CC, 116) of the Webstore Subsystem automatically detects the new sales order data at the Webstore database 631, and initiates a credit (or debit) card authorization for the total amount of the sales order. When the authorization is received, the authorization information is stored at the Webstore database. However, if there is a problem obtaining authorization for the customer's credit (or debit) card, the CC component 116 may issue a trouble ticket to the Help Desk 144 for special handling. Assuming that a credit or debit card authorization is obtained for a particular sales order, the WS forwards the sales order data from the database 631 to the OMS for processing (46).

After the customer has placed a particular order at the Webstore, the customer may modify or cancel the order at any time until a predetermined cutoff time associated with that order has passed. When a customer desires to modify a particular order, for example, he/she submits (48) the order modification information to the Webstore. Upon receiving the order modification data, the WS processes (50) the data, and updates the sales order data stored on the Webstore database. The processing of an order modification information may include, for example, recalculating tax, capacity, and other information related to the order. The updated sales order data may also sent to the OMS for processing As shown at (52) a customer may also achieve modification or cancellation of an order via the CRM subsystem 126. For example, the customer may telephone a customer service representative (CSR) and ask the CSR to modify or cancel a particular order. The CSR may implement the order modification via the CRM subsystem 126. The CRM processes (54) the order modification data, and updates the sales order data stored on the Webstore database.

At (56) the order cutoff time occurs. At this point, the customer can no longer modify the order (until it is delivered). A plurality of events which occur after the cutoff time has passed or elapsed are described in FIG. 7B of the drawings.

The data flow diagram of FIG. 7B may be thought of as continuing from where the data flow of FIG. 7A left off. However, for purposes of clarification and in order to avoid confusion, several subsystems and/or components from FIG. 7A have been omitted from FIG. 7B in order to provide a more simplified illustration.

As shown in FIG. 7B, at (56) the order cutoff time occurs. After the cutoff time has occurred for a particular order, the OMS forwards (58) the sales order data relating to the cutoff order to OFS. When OFS receives the sales order, it processes (i.e., fulfills) the order, and transfers the processed order to an area delivery station for delivery to the customer. After the order has been processed and shipped to the delivery station, at (60) the OFS sends shipment confirmation data to OMS. The OMS then processes (62) the shipment confirmation data received from OFS at least a portion of the shipment confirmation data to the Webstore Database.

Upon detecting and retrieving the shipment confirmation data from the Webstore database, the Transportation Subsystem generates MFD data, which include, for example, customer order history information, delivery vehicle routing information, shipment data, etc. At (64), the MFD data is then sent to the MFD subsystem, whereupon it is then downloaded into appropriate MFDs. According to a specific embodiment, each MFD may be assigned to a different delivery courier. The MFD server uses the delivery courier association information to determine the particular MFD data set to be downloaded into each MFD. According to a specific implementation, the delivery courier is responsible for downloading and uploading data between the MFD and the MFD server.

After the appropriate MFD data has been downloaded into a particular MFD, a download confirmation message may be sent (65) from the MFD subsystem 512 to the Transportation Subsystem. Upon receiving the MFD data download confirmation, the MFD device (which includes the downloaded MFD data) is transferred (66) to the appropriate delivery courier assigned to that particular delivery route. At (68) the delivery courier is dispatched after the MFD data has been downloaded to his/her MFD, and the customer shipments to be delivered have arrived from the distribution center.

At (70) the customer order is delivered to the customer. According to a specific embodiment, all totes associated with the customer's order are off-loaded from the delivery vehicle and left at the customer site. The customer may be charged a deposit fee for each tote retained by the customer. This transaction may be processed by the MFD (carried by the delivery courier) by scanning the license plate ID of each tote delivered to the customer. The totes may be picked up, for example, at the time of the next customer delivery, or at a scheduled pick-up. Further, returned totes may also be processed by the MFD, and a credit issued to the customer.

While the delivery courier is at the customer site, the customer may initiate (72) one or more customer service requests (e.g., returns, adjustment, credit, refund, etc.) with the delivery courier. For example, the customer may chose to modify the delivered order by returning unwanted items. The returned items may be immediately received by the courier and processed using the MFD. The customer may also return items from previous orders. For example, in a specific embodiment, the MFD will include the customer's order history for the past 30 days. In this example, the customer will be allowed to return items to the delivery courier which were purchased within the past 30 days.

The delivery courier may process (74) the customer service request(s) using the MFD, provided that the MFD has been configured or programmed to process the request(s). After processing the customer service request, the MFD re-computes the customer's balance and generates (76) a modified receipt showing the adjusted balance. The modified receipt may also include a list of all billed items, item returns, adjustments, credits, etc. The receipt is then presented (78) by the delivery courier to the customer.

Additionally, according to a specific embodiment, the delivery courier may unpack each tote at the customer site, and use the MFD to scan each item delivered to the customer. In this way, any order adjustments (e.g., due to shorts or damaged items) may be immediately processed, and the customer only billed for actual items received.

At (79) the delivery courier returns to the delivery or cross-dock station and uploads the data from his/her MFD into the MFD server. The MFD server then forwards the customer returns data and modified billing data to the Webstore database via the Transportation Subsystem. Additionally, the modified customer billing data is also detected and retrieved by the funds capture component 116. Using the modified billing data, the funds capture component initiates (80) a funds capture from the customer's financial account. If the funds capture is unsuccessful, a trouble ticket may be issued to the Help Desk 144 for special handling. Assuming, however, that the funds capture is successful, the payment confirmation information is stored on the Webstore database. According to a specific embodiment, billing adjustments to customer accounts may also be implemented by the CRM Subsystem. In the example shown in 7B, the customer requests (82) a bill adjustment to be initiated via the CRM. Upon receiving the bill adjustment request, the CRM generates (84) bill adjustment data and passes the bill adjustment data to the Webstore to be processed and stored on the Webstore database.

At (85) the OMS periodically polls the Webstore database to retrieve customer returns data, customer billing data, and customer billing adjustment data. According to a specific embodiment, the OMS may poll the Webstore database every 2 hours to retrieve the completed ordering data.

As shown at (86), the CRM may also be used by a customer to schedule a delivery pickup, without having to place a new order. For example, the customer may schedule a delivery pickup for a specific time with a CSR. The CSR forwards (88) the pickup data to the CRM, which then forwards the pickup data to the Transportation Subsystem for scheduling.

Catalog Organization

Figure 11:
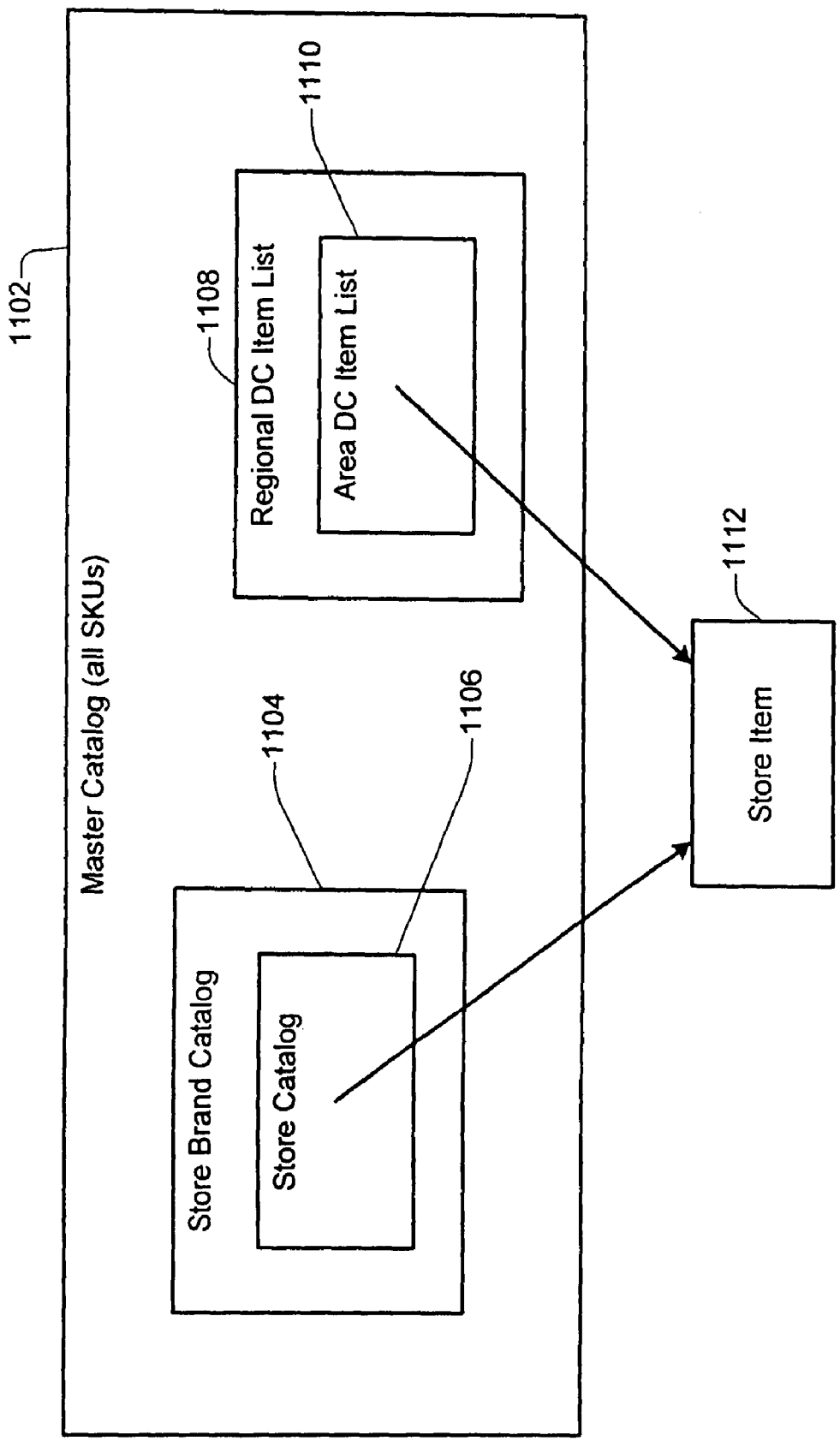
FIG. 11 shows a block diagram illustrating a relationship between catalogs, item lists, and store items according to a specific implementation of the present invention.

FIG. 11 shows a block diagram illustrating the relationships between catalogs, store brand catalogs, store catalogs, item lists, and store items, in accordance with a specific embodiment of the present invention. Each of the catalogs illustrated in FIG. 11 may be generated by PUB Subsystem 140. Alternatively, at least a portion of the catalogs may be generated by Webstore Subsystem 132. As illustrated in FIG. 11, a master catalog 1102 may include all SKU information stored within the PUB Subsystem. A store brand catalog 1104 is a subset of the master catalog. A store catalog 1106 is a subset of the associated store brand catalog.

According to a specific embodiment, each store or store type represented by the system of the present invention may have a particular "look and feel," such as, for example, a convenience store, a general department store, a grocery store, a specialty store, etc. A store brand may be thought of as a brand unit which represents a common identity for group of stores. For example, "Webvan Market" is the store brand for the stores "Webvan Market-Bay Area" and "Webvan Market-Atlanta."

A store brand may include a plurality of stores. Each store may be associated with one or more distribution centers. However, according to at least one embodiment, a distribution center may only be associated with at most one store per store brand. Thus, for example, no stores belonging to the same store brand will overlap a given service area. Moreover, a customer may automatically be routed to an appropriate store based upon the delivery address of the customer.

In a manner similar to the catalog hierarchy, items handled by a regional or area distribution center may be derived from a subset of the SKUs identified in the master catalog. For example, as shown in FIG. 11, an area DC item list 1110 is a subset of its regional DC item list 1108. Store items may be constructed based on a particular store catalog and a particular DC item list. A store item represents what is displayed to a customer at a particular on-line store or webstore.

One important aspect of the present invention relates to scalability and data integration. According to a specific embodiment, all SKU information which is used by each subsystem of the present invention is based upon the SKU data derived from the master catalog of the Publication Subsystem. Thus, for example, all merchandise residing in each regional DC (worldwide) will have the same SKU association, which is based upon the master catalog defined by a centralized PUB Subsystem.

Distribution Center

Figure 13:
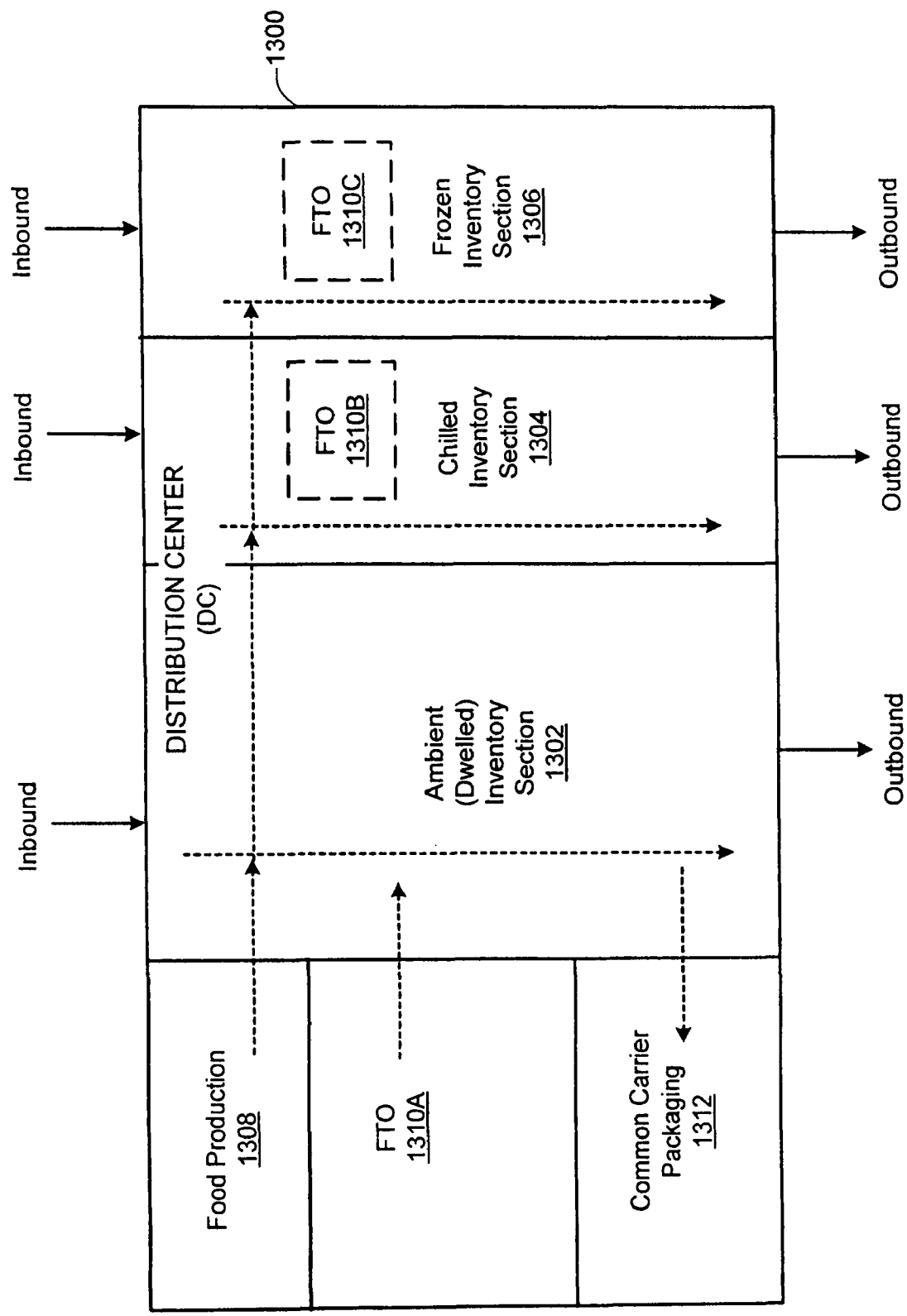
FIG. 13 shows a block diagram of a distribution center operation in accordance with a specific embodiment of the present invention.

FIG. 13 shows a block diagram of a distribution center (DC) operation in accordance with a specific embodiment of the present invention. In the embodiment of FIG. 13, DC 1300 is configured to function as an area DC for customer order fulfillment. However, according to an alternate embodiment, DC 1300 may be configured to function as a regional DC which services multiple area DCs. Additionally DC 1300 may also manage common carrier shipping of selected orders.

As shown in FIG. 13, the DC 1300 organizes inventory merchandise into different "picking" categories, depending upon the recommended storage temperature of the item. Thus, for example, an item which is typically stored at ambient or room temperature will be stocked in the ambient inventory section (1302) of the DC. Refrigerated items are stored in the chilled inventory section (1304) of the DC, and frozen items are stored in the frozen inventory section (1306) of the DC. The DC may also include at least one food production section 1308 which prepares pre-packaged meals and other food products. Additionally, the DC may also include one or more fill-to-order (FTO) sections (e.g. 1310A) for processing customer specific orders such as, for example, special food orders, produce orders, meat orders, etc. According to a specific embodiment, each inventory section of the DC (1302, 1304, 1306) may include a respective FTO section (e.g. 1310A, 1310B, 1310C). Further, DC 1300 may also include a common carrier packaging and shipping section 1312, which may be used, for example, for shipping items to customers (via common carrier) who do not reside in a deliverable area serviced by the delivery couriers of the present invention.

As described previously with respect to FIG. 1, the distribution center includes a system of conveyors, carousels, scanners, and hand-held computing units for automating both the order fulfillment (outbound) and inventory restocking (inbound) processes, which are managed by the Order Fulfillment Subsystem 160.

Figure 14:
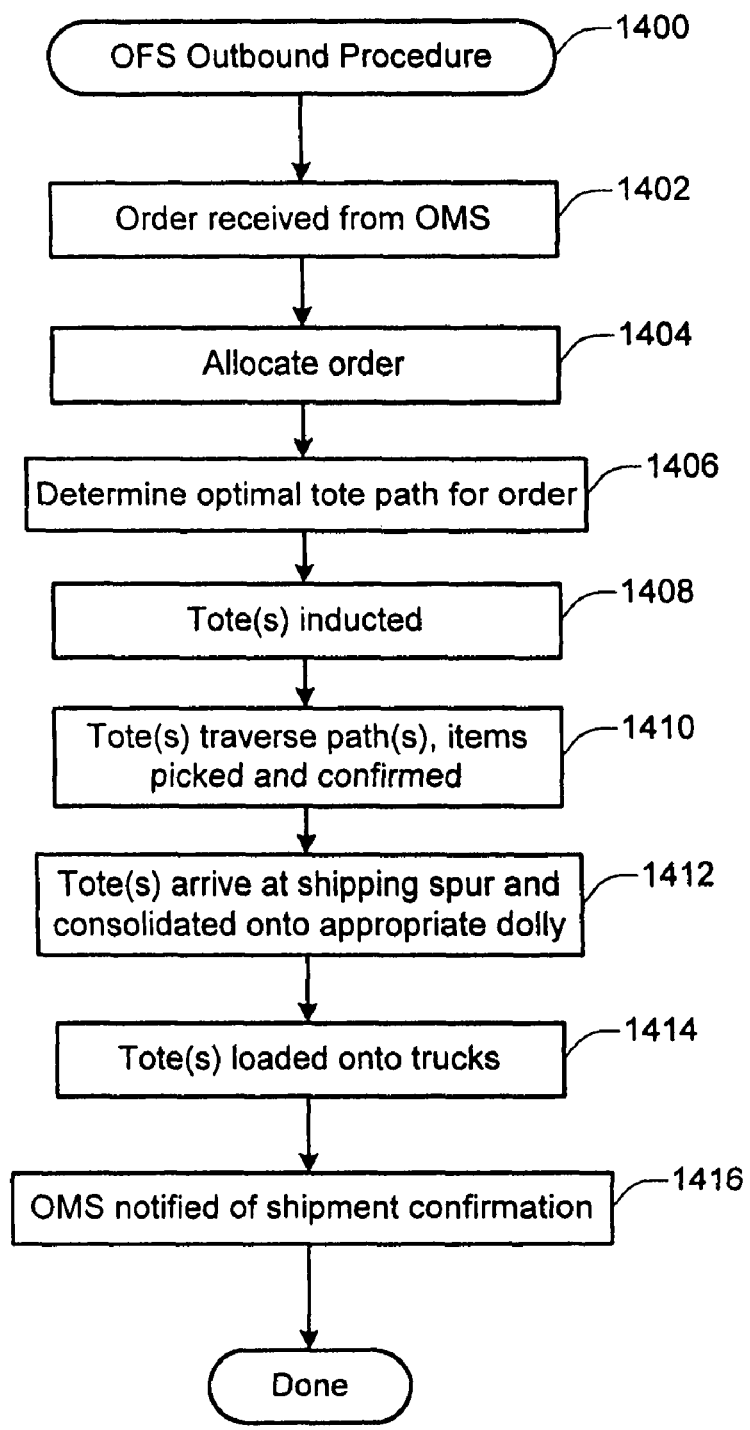
FIG. 14 shows a flow diagram of an OFS outbound procedure in accordance with a specific embodiment of the present invention.

FIG. 14 shows a flow diagram of an OFS Outbound Procedure 1400 in accordance with a specific embodiment of the present invention. The OFS Outbound Procedure generally describes the events which may occur during fulfillment of a customer order. At 1402, the OFS receives a customer order from the OMS. The OFS then allocates (1404) the order, wherein the physical warehouse location of each item of the order is determined. Using the order allocation data, the OFS then determines (1406) the number of totes needed to adequately fulfill the order, and the optimal tote path for each tote. At 1408 the tote(s) are inducted into the DC carousel/conveyer system. Each tote automatically traverses (1410) a pre-determined, designated tote path. The tote path may be dynamically and automatically altered if problems are detected in any portion of the DC operations. While the tote is traversing its designated path, it makes stops at designated locations within the DC where items relating to the customer order are stored. A human operator or "picker" places specified order items into the tote, and verifies the order item fulfillment by scanning each item placed into the tote, as well as the tote's license plate ID, with a handheld computing device (e.g., RF gun). After the picker has confirmed placement of the specified items into the designated tote, the tote is then reintroduced to the automated tote transport system, where it continues to travel along its designated tote path.

After all items for a particular tote have been picked and confirmed, the tote is routed to a shipping spur where it is consolidated (1412) onto an appropriate dolly, which may include other totes intended for a specific delivery route. The dolly and totes are then loaded (1414) onto a truck or other vehicle for shipment to a cross dock (or area delivery) station. At the cross dock station, the totes will be loaded into delivery vehicles for delivery to the customers. According to an alternate embodiment, at lest a portion of the customer totes may be shipped directly from the area DC to the customer, thereby eliminating the cross dock station transfer. Once the tote(s) corresponding to a particular customer order have been shipped to the cross dock station (or directly to the customer), the OMS is notified (1416) of the shipment confirmation. According to a specific embodiment, the shipment confirmation data sent to the OMS from the OFS may include, for example, the order ID, an order line number (SKU) for each item shipped (as well as the quantity), the tote IDs associated with the order, the dolly ID, the delivery vehicle ID, etc.

Like the outbound procedure, items may be received and restocked in the distribution center using the automated material handling and transport system, illustrated, for example, in block 170 of FIG. 1.

Figure 15:
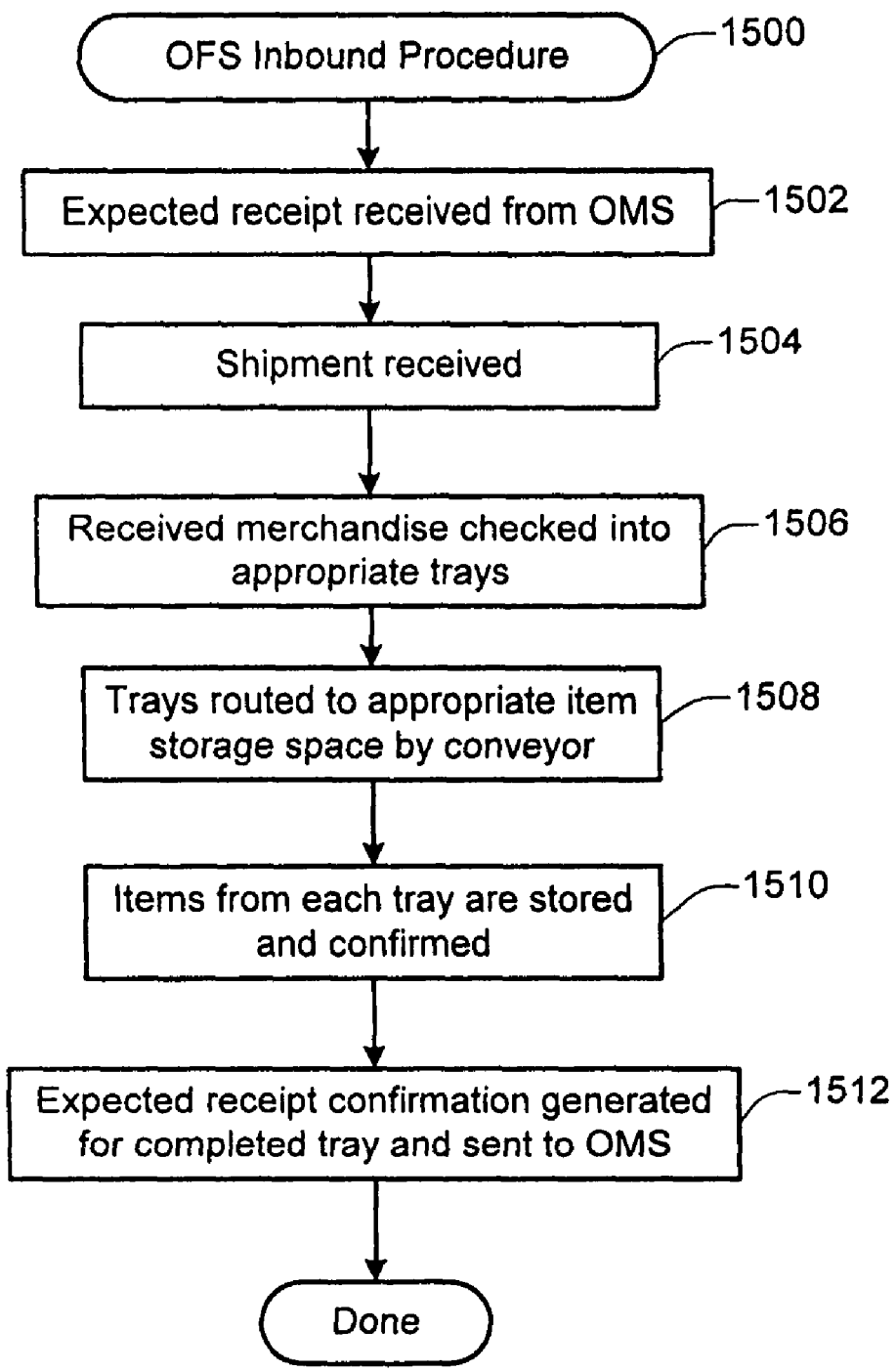
FIG. 15 shows a specific embodiment of an OFS inbound procedure in accordance with a specific embodiment of the present invention.

FIG. 15 shows a flow diagram of an OFS inbound procedure 1500 in accordance with the specific embodiment of the present invention. The inventory restocking process initially begins at the OMS where a purchase order is generated for specific inventory items. At 1502, an expected receipt relating to the purchase order is received at the OFS from the OMS. The expected receipt data may include, for example, the vendor name, an expected receipt ID number, estimated arrival time of the shipment, and the SKUs and quantities of the items ordered. Once the expected shipment is received (1504) at the distribution center, the received merchandise is checked (1506) into appropriate trays. A tray represents a container which may be used to transport received items of merchandise for restocking. Like the tote, each tray includes a unique, scannable license plate ID. When merchandise is checked into a tray, both the merchandise and the tray may be scanned using an RF gun. The trays are then automatically routed (1508) to their appropriate locations using the automated conveyer system. Once a tray arrives at its designated location, the items from that particular tray are stored (1510) and confirmed by the picker (via an RF gun, for example). According to a specific embodiment, for each completed tray of items restocked, an expected receipt confirmation is generated (1512) by the OFS and sent to the OMS. The expected receipt confirmation data may include, for example, the expected receipt ID, the SKU(s) of the items restocked and their respective quantities.

OTHER EMBODIMENTS

Figure 2:
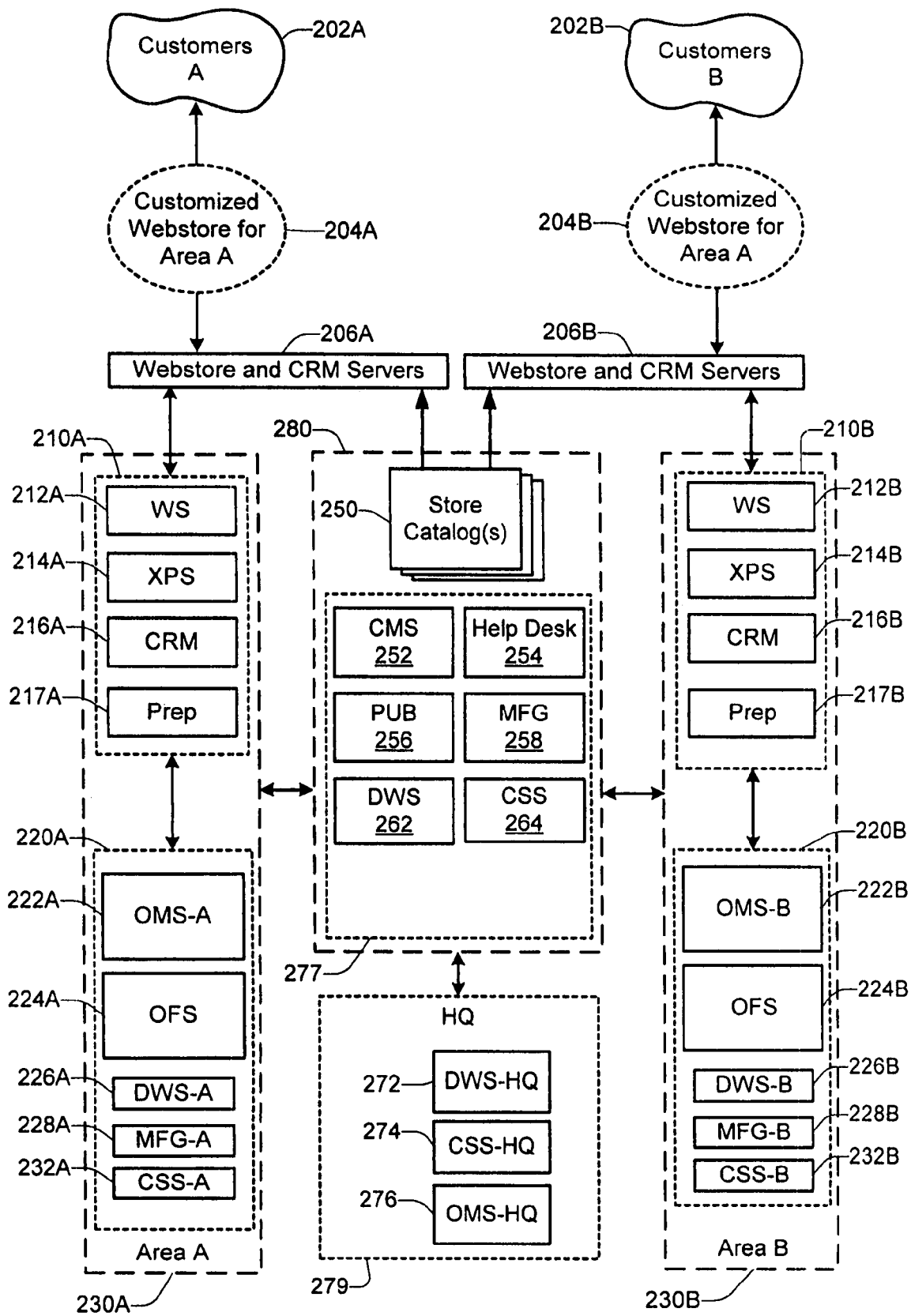
FIG. 2 shows a schematic block diagram of an integrated system architecture 200 in accordance with an alternate embodiment of the present invention.

FIG. 2 shows a block diagram of an alternate embodiment of the integrated system 200 of the present invention. The embodiment of FIG. 2 is particularly useful for allowing different webstores to present different information about the same product to different customers which reside in different geographic areas. Thus, for example, customers A (202A) may reside in San Francisco, while customers B (202B) may reside in Atlanta. As used in this section, the term "webstore" represents an on-line store which is implemented via a respective Webstore Subsystem.

Using the technique of the present invention as shown in FIG. 2, a first webstore (204A) may be customized specifically for customers A (e.g. residing in San Francisco), and a second webstore (204B) may be customized specifically for customers B (e.g. residing in Atlanta). The different webstore customizations may include, for example, different languages, different descriptions of the same item (e.g. "soda" vs. "pop"), different catalog items displayed to the customers, different pricing, etc. Each webstore 204A and 204B may be serviced by one or more respective servers 206A and 206B. Moreover, as shown in FIG. 2, each webstore implementation includes a respective Front Office system and Back Office system, as well as centralized Publication, Data Warehouse, and CSS Subsystems. For example, the Area A webstore 204A is managed primarily by an Area A business unit 230A, which includes a Front Office system 210A, and a Back Office system 220A. Similarly, the Area B webstore 204B is managed primarily by an Area B business unit 230B, which includes a respective Front Office system 210B, and a respective Back Office system 220B. The individual subsystems (e.g., WS, XPS, CRM, OMS, OFS, DWS, MFG, CSS) of each respective area business unit 230A and 230B are functionally similar to their corresponding subsystem counterparts previously described with reference to FIG. 1 of the drawings.

A primary difference between the embodiment of FIG. 1 and the embodiment of FIG. 2 is the inclusion of a centralized management system 280 (FIG. 2), and a headquarters (HQ) business unit 279. As shown in FIG. 2, for example, the centralized managed system 280 may comprise a plurality of store catalog components 250, which may be used for managing the catalog information displayed on each of the webstores 204A, 204B. Additionally the centralized management system 280 includes a plurality of master subsystems 277, which may be used for managing corresponding satellite subsystems in each of the area business units. For example, CSS 264 may be configured to receive data from both CSS-A 232A and CSS-B 232B, OMS-HQ 276 may be configured to manage and store data from both OMS-A 222A and OMS-B 222B, etc.

The headquarters business unit 279 manages all business unit operations, and includes a plurality of HQ subsystems (e.g. DWS-HQ 272, CSS-HQ 274, OMS-HQ 276) for managing the day-to-day operations of the HQ business unit. For example, DWS-HQ 272 may be configured to function as a repository of reports that have been run at HQ 279. CSS-HQ 274 manages HQ-related human resource functions, such as, for example associate scheduling for the customer service call center. OMS-HQ 276 primarily manages finance functions associated with HQ business operations.

One important feature relating to the embodiment of FIG. 2 is that catalog information and content relating to each of the area specific webstores 204A, 204B is managed by the central management system 280, rather than any of the area business units 230A, 230B. This feature is described in greater detail with reference to FIG. 2A.

Figure 2A:
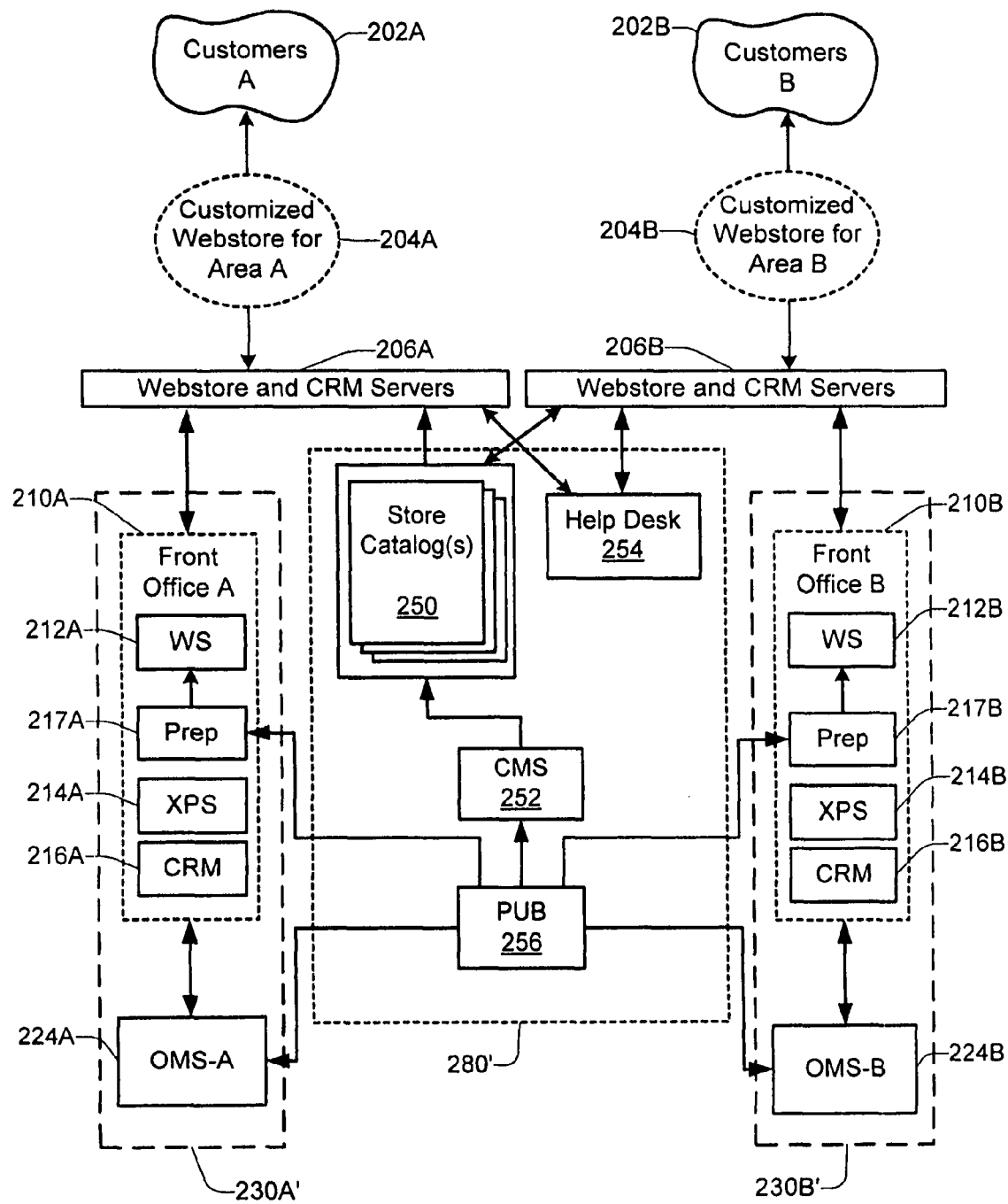
FIG. 2A shows a schematic block diagram illustrating various interactions which take place between at least a portion of the elements shown in the system of FIG. 2.

FIG. 2A shows a block diagram illustrating the interactions between at least a portion of the subsystems shown in FIG. 2. In the embodiment of FIG. 2A, a centralized PUB Subsystem 256 manages and controls all SKU and catalog content for each of the area business units 230A, 230B (and also for each of the area specific webstores). The functionality of PUB Subsystem 256 is similar to that of PUB Subsystem 140 of FIG. 1.

Thus, for example, in a manner similar to that described in FIG. 9, the PUB Subsystem 256 (FIG. 2A) publishes appropriate SKU information to each of the satellite OMS subsystems 224A, 224B. This data eventually gets propagated to respective OFS subsystems 224A, 224B. Additionally, the PUB Subsystem 256 publishes its data to each satellite Prep Subsystem 217A, 217B, wherein the data is eventually passed to the respective WS subsystems 212A, 212B.

The PUB Subsystem 256 also publishes its catalog data to the Content Management Subsystem (CMS) 252. The function of the CMS 252 is to create and maintain the content pages for each of the webstores 204A and 204B. The catalog content information for each webstore is then exported to the Store Catalog block 250, which includes a database or other memory structure for storing the different webstore catalogs. The webstore servers 206A, 206B access the appropriate store catalog information stored in the catalog database 250, and display the retrieved information to their respective customers 202A and 202B.

Catalog block 250 may include a plurality of store catalogs, including, a master catalog, store brand catalogs, and store catalogs. The master catalog includes all SKU information from the Publishing Subsystem 256. A store brand catalog includes a group of SKUs that are available to the stores associated with a given store brand. According to a specific embodiment, each store brand has one store brand catalog. A store catalog may include a list of all stores' SKUs for a given store. Additionally, it will be appreciated that a SKU may be available to a specific store catalog, but may not have been selected to be displayed to the customer.

Another feature of the embodiment of FIG. 2A relates to the centralized customer support center. For example, as shown in FIG. 2A, customer service representatives may be accessed by customers 202A and 202B via a centralized Help Desk subsystem 254. The Help Desk subsystem 254 is configured to allow to be accessible to customers from different geographic areas. Thus, according to a specific embodiment, there is one centralized customer service operation serving all customers of a given area such as, for example, the United States.

Figure 3:
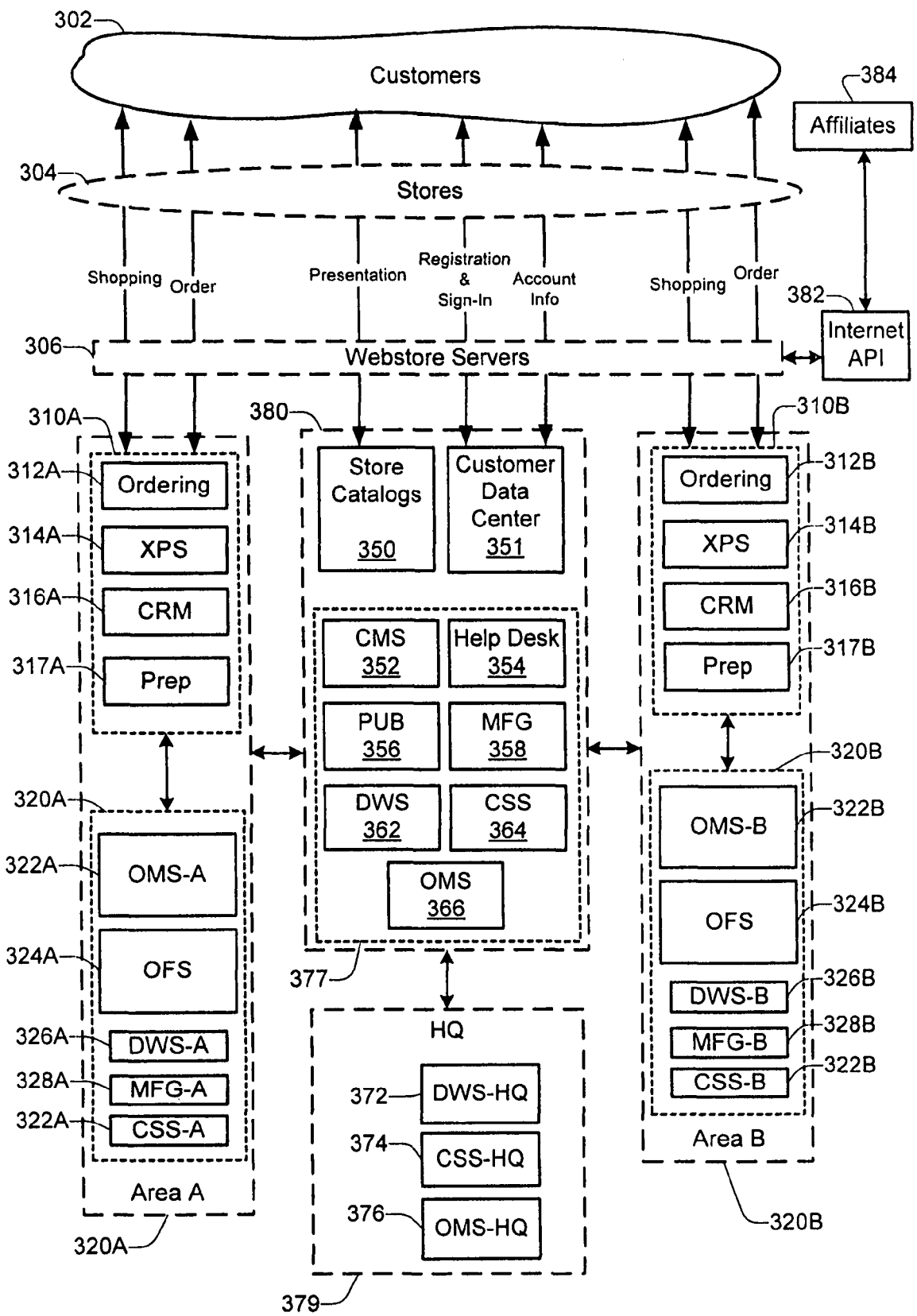
FIG. 3 shows a schematic block diagram of an integrated system architecture in accordance with a different embodiment of the present invention.

FIG. 3 shows a block diagram of an alternate embodiment of the present invention. Many of the components and subsystems of FIG. 3 are functionally similar to the respective components and subsystems described previously with respect to FIGS. 2 and 2A, and therefore will not be described in greater detail. Additionally, the ordering subsystem 312A, 312B is functionally similar to the Webstore Subsystem 132 described previously with respect to FIG. 1, with the exception that the ordering subsystem is not responsible for managing customer registration or account information.

However, the embodiment of FIG. 3 includes several features and advantages not described in the embodiments of FIGS. 1 and 2. For example, according to the embodiment of FIG. 3, customers 302 from different geographic areas may access one or more different webstores 304 via the Internet or other data network. The customer registration and sign-in process for each webstore is handled by a centralized customer data center 351. Additionally, the customer data center 351 manages the customer's account and billing information. The catalog presentation and content for each store is managed in a manner similar to that described in FIG. 2A. The Publication Subsystem 356 publishes its catalog data to the Content Management Subsystem 352. From there the data is processed, and store catalogs are generated. The generated store catalogs are stored in the Store Catalog database 350, which may be accessed by webstore servers 306. The webstore servers use the information from each store catalog to display the appropriate content corresponding to each webstore.

Additionally, the embodiment of FIG. 3 enables affiliates 384 to introduce their own on-line storefronts via an Internet API 382. According to one implementation, an affiliate is a third party which sells merchandise to customers 302 through one of the on-line stores 304, which is managed by the system 300 of FIG. 3. The affiliate may control the content of the affiliate store catalog, however, shopping, ordering, fulfillment, and delivery are handled by area business units (e.g. 320A, 320B)

Customer shopping and ordering is handled by area business units (e.g., 320A, 320B, etc.). A customer may be routed to the closest area business unit based upon the customer's delivery address or other information relating to the customer's physical location. Thus, for example, a customer from Atlanta will be routed to the Atlanta business unit, whereas a customer from San Francisco will be routed to the San Francisco business unit for handling shopping, ordering, fulfillment and delivery details. Alternatively customers from different areas may be routed to a single Front Office system configured to handle customer ordering, shopping, and other electronic commerce transactions.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A computer-implemented method for assisting a customer in ordering a product from an online store via a computer network, the computer network including at least a customer interface system in communication with a storage system, the customer interface system facilitates ordering the product, and the storage system facilitates storage of the product, the method comprising:
   providing availability information to the customer regarding the product via the customer interface system, and allowing the customer to purchase via the customer interface system to assist the customer in ordering the product,
   wherein the availability information is provided via a database configured to be accessed by the customer interface system, and informs the customer that the product can be pre-ordered when the product is not currently in stock but available by a specific date;
   providing delivery timing information regarding the product to the customer via the customer interface system even when the product is not currently in stock, to assist the customer in ordering the product;
   subsequently receiving a customer order for the product from the customer via the customer interface system;
   receiving the product at a physical storage location for storing a plurality of products of the online store that allows a plurality of customers to purchase from the online store, and the product becoming in stock after the receiving;
   automatically updating the availability information in the database, based on the product changing from not being in stock to being in stock, after receiving the customer order, wherein the customer order has a status, which depends on the product's availability information, and which is updated in view of the product changing from not being in stock to being in stock;
   allowing the customer to access information regarding the updated status of the customer order, which depends on the product's availability information, via the customer interface system; and
   managing, by the storage system, the physical storage location,
      wherein the storage system is configured to access another database regarding products in the physical storage location, the another database not being the database of the customer interface system,
      wherein information in the another database is configured to indicate whether the product is in stock at the physical storage location, and
      wherein the availability information for customers is related to the product being in stock or not being in stock at the physical storage location.

2. A computer-Implemented method as recited in claim 1, wherein when the product is in stock, the availability information would indicate that the product is in stock.

3. A computer-implemented method as recited in claim 1, wherein when the product arrives at the physical storage location, information regarding its arrival is automatically transmitted to the customer interface system to change the availability information.

4. A computer-implemented method as recited in claim 1, wherein the delivery timing information depends on capacities related to the physical storage location to fulfill the order.

5. A computer-implemented method as recited in claim 4, wherein a plurality of times are presented to the customer for the customer to select regarding a time for the customer to receive the product, and
   wherein the physical storage location is determined to have sufficient capacities to fulfill the customer order at the time selected by the customer to receive the product.

6. A computer-implemented method as recited in claim 5, wherein after the customer has selected one of the times to receive the product, a corresponding amount of capacities related to the physical storage location are automatically reserved to fulfill the customer order at the selected time.

7. A computer-implemented method as recited in claim 1, wherein the computer network includes a delivery system for managing delivering the product to the customer,
   wherein the customer order includes a location specified by the customer to receive the product, and
   wherein the delivery timing information depends on capacities related to delivering the product to the location.

8. A computer-Implemented method as recited in claim 7, wherein capacities related to delivering the product depend on delivery vehicle capacities.

9. A computer-implemented method as recited in claim 1, wherein the computer network includes a purchasing system that is configured to purchase products from other entitles, and
   wherein availability information is not provided to the customer via the customer interface system before the product is purchased from an entity.

10. A computer-implemented method as recited in claim 9, wherein the computer network includes a system for inventory that is configured to maintain inventory information of products of the online store, and
   wherein based on a purchase order to purchase the product from the entity, information related to an expected arrival date of the product at the physical storage location of the online store is provided to the system for inventory.

11. A computer-implemented method as recited in claim 9, wherein the computer network includes a system for inventory that is configured to maintain inventory information of products of the online store,
wherein the product is related to a UPC code, and
wherein when the product arrives at the physical storage location of the online store from the entity, the system for inventory is configured to recognize the product via the UPC code.

12. A computer-Implemented method as recited in claim 1, wherein the computer network includes a merchant system that provides an interface for a merchant to directly input information regarding the product for customers interested in the product, and
wherein the merchant is not an employee of, or does not work for, the online store.

13. A computer-implemented method as recited in claim 12, wherein the product is not made available to the customer to purchase before a purchase order has been issued by the online store to the merchant for the product, though the merchant has already input information regarding the product to the online store.

14. A computer-Implemented method as recited in claim 1, wherein when shipping the product to the online store has been delayed, the availability information is automatically changed to a later date.

15. A computer-implemented method as recited in claim 1, wherein the method further comprises receiving, at the computer network, data from a wireless device of a carrier at or proximate to a delivery address of another customer, regarding return of the product previously ordered by the another customer, wherein the availability information in the database can be adjusted in view of the received data.

16. A computer-Implemented method as recited in claim 1, wherein the delivery timing information is automatically changed in view of the another customer returning the product the another customer ordered.

17. A computer-Implemented method as recited in claim 1, wherein the delivery timing information is automatically changed in view of yet another customer deleting the product from an order of the another customer before checkout from ordering online.

18. A computer-implemented method as recited in claim 1, wherein the delivery timing information is automatically changed in view of yet another customer abandoning an online shopping session that includes the product.

19. A computer-implemented method for assisting a customer in ordering a product from an online store via a computer network, the computer network including at least a customer interface system in communication with a storage system, the customer interface system facilitates ordering the product, and the storage system facilitates storage of the product, the method comprising:
providing availability information to the customer regarding the product via the customer interface system, and allowing the customer to purchase via the customer interface system to assist the customer in ordering the product, wherein the availability information is in a database configured to be accessed by the customer interface system;
providing timing information to the customer, via the customer interface system, regarding when the online store expects to be able to get the product to the customer, even when the product is currently not available to be delivered to the customer, to assist the customer in ordering the product;
subsequently receiving a customer order for the product from the customer via the customer interface system, wherein the product being ordered is currently not available to be delivered to the customer by the online store, but the availability information indicating the product being available by a specific date; and
receiving the product at a physical storage location for storing a plurality of products of the online store that allows a plurality of customers to purchase from the online store, and the product becoming available to be delivered to the customer from the physical storage location after the receiving;
subsequent to receiving the product, having the product delivered to the customer after the product becomes available to be delivered; and
managing, by the storage system, the physical storage location,
wherein the storage system is configured to access another database regarding products in the physical storage location, which is not the database of the customer interface system,
wherein information in the another database is configured to indicate whether the product is available at the physical storage location, and
wherein the availability information for customers is related to the product not at the physical storage location or at the physical storage location.

20. A method as recited in claim 19, wherein when the product becomes available, the availability information would indicate that the product is available.

21. A method as recited in claim 19, wherein the customer is allowed to access status information regarding the customer order via the customer interface system, the status information including at least updated availability information of the product.

22. A method as recited in claim 1,
wherein information from the database of the customer interface system and information from the database of the storage system are periodically transmitted to a data warehouse system, and
wherein the data warehouse system analyzes information received to generate reports regarding the online store.

23. A method as recited in claim 19,
wherein information from the database of the customer interface system and information from the database of the storage system are periodically transmitted to a data warehouse system, and
wherein the data warehouse system analyzes information received to generate reports regarding the online store.

24. A method as recited in claim 19, wherein the method further comprises receiving, at the computer network, data from a wireless device of a carrier at or proximate to a delivery address of the another customer, regarding return of the product previously ordered by the another customer, wherein the availability information in the database can be adjusted in view of the received data.

* * * * *